(12) United States Patent
Horiba

(10) Patent No.: US 9,341,538 B2
(45) Date of Patent: May 17, 2016

(54) EVAPORATED FUEL PROCESSING DEVICE AND METHOD FOR DIAGNOSING EVAPORATED FUEL PROCESSING DEVICE

(71) Applicant: HONDA MOTOR CO., LTD., Tokyo (JP)

(72) Inventor: Ayumu Horiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 14/140,696

(22) Filed: Dec. 26, 2013

(65) Prior Publication Data
US 2014/0182360 A1    Jul. 3, 2014

(30) Foreign Application Priority Data

Dec. 27, 2012 (JP) ................................ 2012-284559

(51) Int. Cl.
*G01M 3/02* (2006.01)
*G01M 3/28* (2006.01)

(52) U.S. Cl.
CPC .................................. *G01M 3/2876* (2013.01)

(58) Field of Classification Search
CPC .................................................. G01M 3/2876
See application file for complete search history.

(56) References Cited

U.S. PATENT DOCUMENTS

| | | | | |
|---|---|---|---|---|
| 5,542,397 A * | 8/1996 | Takahata | ............ | F02M 25/0809 123/520 |
| 8,560,167 B2 * | 10/2013 | Jentz | ..................... | G01M 3/025 180/441 |
| 2003/0226549 A1 * | 12/2003 | Takagi | ............... | F02M 25/0818 123/520 |
| 2006/0191330 A1 * | 8/2006 | Hayakawa | ......... | F02M 25/0809 73/114.39 |
| 2012/0215399 A1 * | 8/2012 | Jentz | ..................... | G01M 3/025 701/32.8 |
| 2014/0019002 A1 * | 1/2014 | Jentz | ..................... | G01M 3/025 701/32.8 |
| 2014/0174411 A1 * | 6/2014 | Matsunaga | ........ | F02M 25/0836 123/520 |

FOREIGN PATENT DOCUMENTS

| | | |
|---|---|---|
| JP | 2004-11561 A | 1/2004 |
| JP | 2004-156493 A | 6/2004 |
| JP | 2005-120913 A | 5/2005 |

OTHER PUBLICATIONS

Chinese Office Action issued Oct. 27, 2015, issued in Chinese Patent Application No. 201310726936.8.

* cited by examiner

*Primary Examiner* — Hezron E Williams
*Assistant Examiner* — Mark A Shabman
(74) *Attorney, Agent, or Firm* — Westerman, Hattori, Daniels & Adrian, LLP

(57) ABSTRACT

A evaporated fuel processing device includes a seal valve that seals off the fuel tank from the atmosphere, a canister, a changeover valve that allows or inhibits communication of the canister with the atmosphere, the canister internal pressure sensor, a controller that sends an open/close command to the seal valve and the changeover valve, a diagnosis unit that performs leak diagnosis of an evaporated fuel sealing system, and a negative pressure pump that generates pressure in the evaporated fuel sealing system. The diagnosis unit performs leak diagnosis of the entirety of the evaporated fuel sealing system before performing leak diagnosis of a canister side section. The diagnosis unit performs function diagnosis of the seal valve with the seal valve closed and the changeover valve at a shut-off position based on whether the detection value of the tank internal pressure sensor varies beyond a predetermined range of the generated pressure.

12 Claims, 11 Drawing Sheets

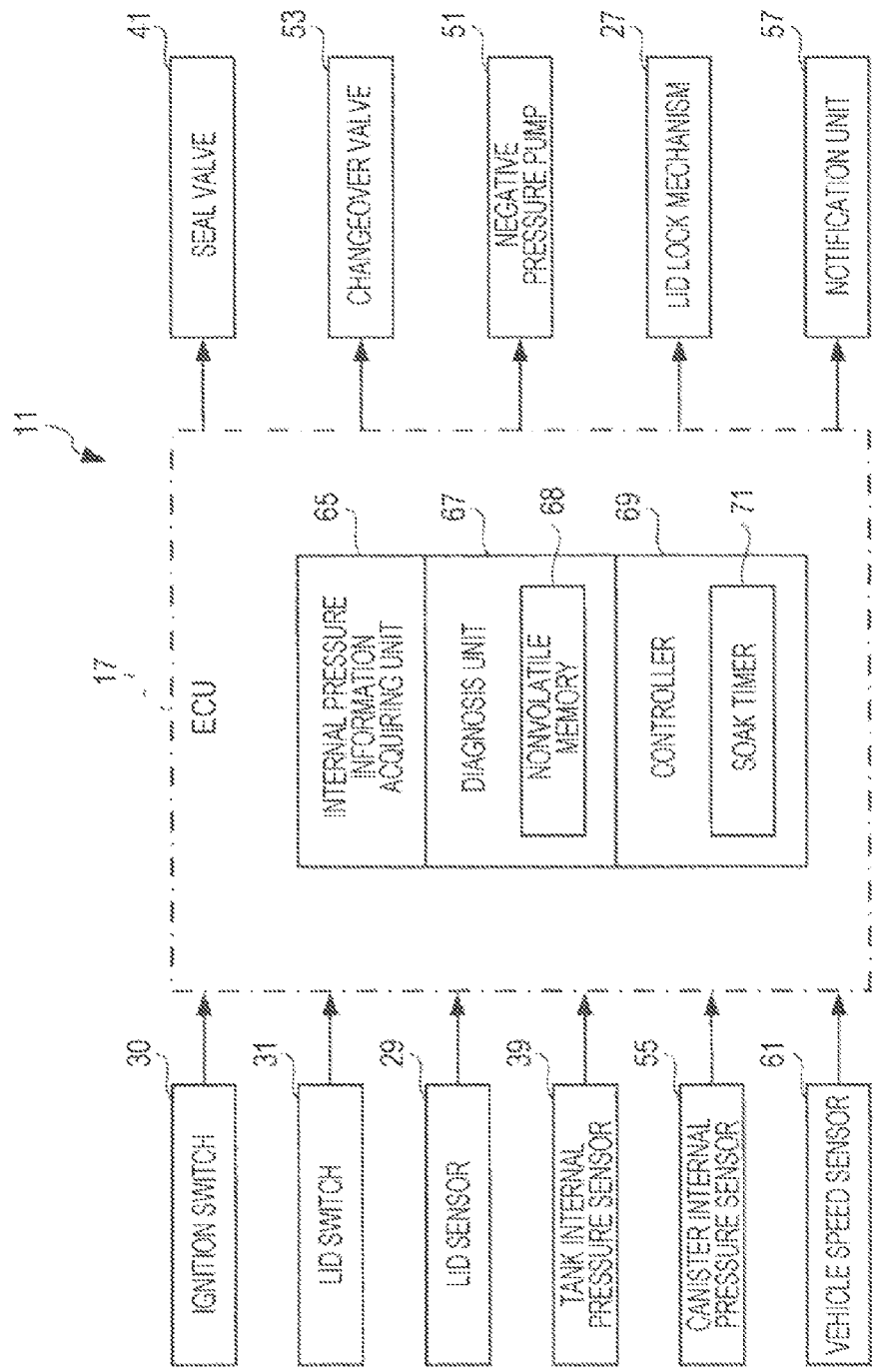

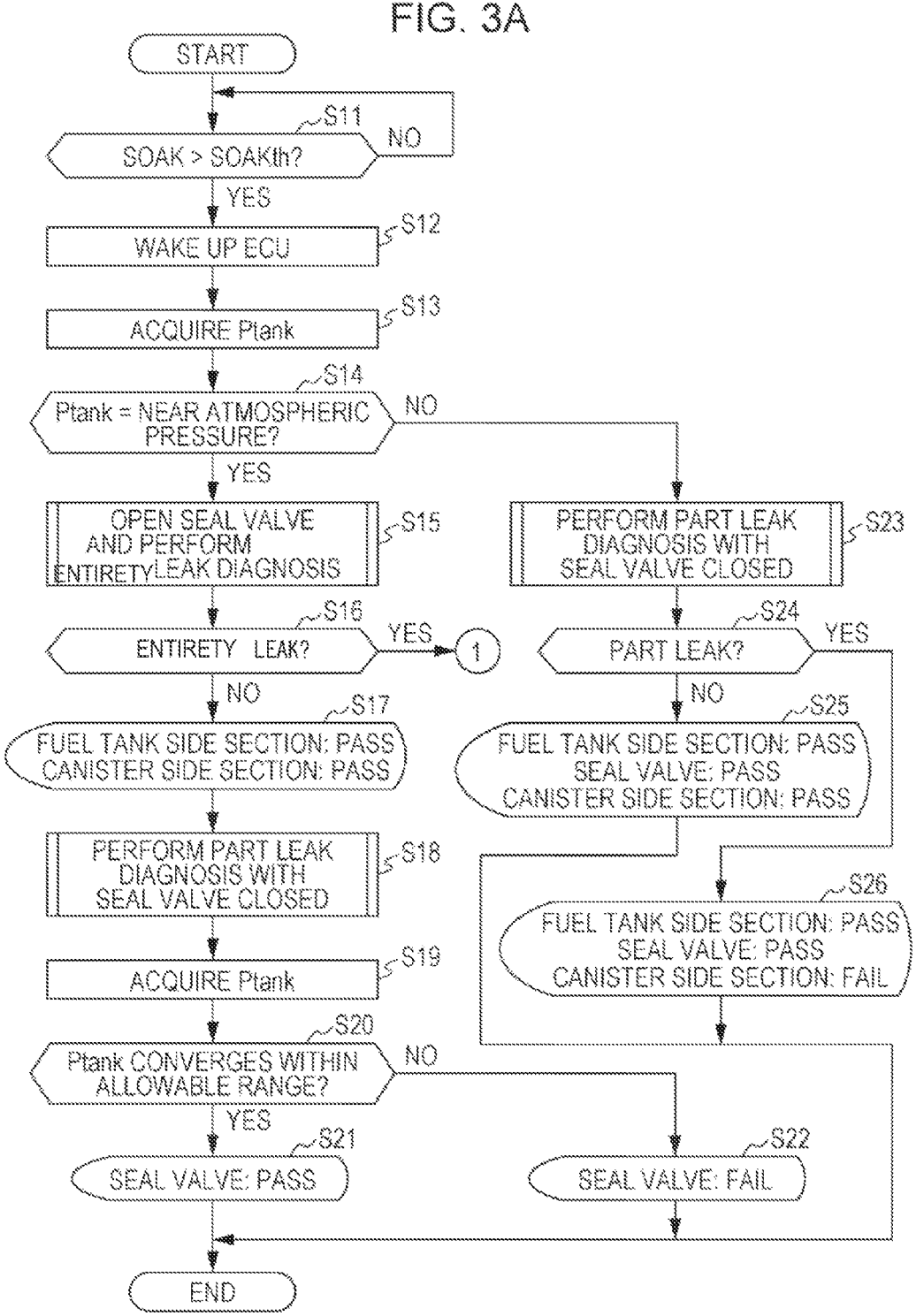

EVAPORATED FUEL PROCESSING DEVICE AND METHOD FOR DIAGNOSING EVAPORATED FUEL PROCESSING DEVICE

CROSS REFERENCES TO RELATED APPLICATIONS

The present application claims priority under 35 U.S.C. §119 to Japanese Patent Application No. 2012-284559, filed Dec. 27, 2012, entitled "Evaporated Fuel Processing Device and Method for Diagnosing Evaporated Fuel Processing Device." The contents of this application are incorporated herein by reference in their entirety.

TECHNICAL FIELD

The present disclosure relates to an evaporated fuel processing device for processing evaporated fuel and a method for diagnosing an evaporated fuel processing device.

BACKGROUND

For example, if liquid fuel is loaded into a fuel tank of a vehicle including an internal-combustion engine, the occupied volume of the fuel increases in the internal space of the fuel tank. Accordingly, the occupied volume of the gas phase region in the internal space relatively decreases. Thus, the pressure of the gas phase region (hereinafter referred to as a "tank internal pressure") becomes higher than the atmospheric pressure. As a result, evaporated fuel accumulated in the gas phase region of the fuel tank attempts to escape into the atmosphere. If the evaporated fuel gas escapes into the atmosphere, the atmosphere is contaminated.

Accordingly, in order to prevent atmospheric contamination caused by escape of the evaporated fuel into the atmosphere, existing evaporated fuel processing devices have a canister in a communication passage between the fuel tank and the atmosphere. The canister includes an adsorbent that temporarily absorbs the evaporated fuel. By allowing the adsorbent of the canister to absorb the evaporated fuel, the tank internal pressure can be maintained at low levels.

For example, Japanese Unexamined Patent Application Publication No. 2004-11561 describes an evaporated fuel processing device having a blocking valve (hereinafter referred to as a "seal valve") in a communication passage between a fuel tank and a canister. The seal valve controls communication between the fuel tank and the canister. In the technology described in Japanese Unexamined Patent Application Publication No. 2004-11561, an intake passage of the internal-combustion engine is allowed to communicate with the canister using a purge passage. A changeover valve that opens or closes off a communication passage between the canister and the atmosphere is provided. A booster pump that applies pressure to the canister while the changeover valve shuts off the canister from the atmosphere is provided. A purge control valve that opens or closes the purge passage is provided. In addition, an electronic control unit (ECU) that controls the seal valve, the changeover valve, the booster pump, and the purge control valve is provided.

According to the technology described in Japanese Unexamined Patent Application Publication No. 2004-11561, a state in which the fuel tank is disconnected from the canister can be achieved.

SUMMARY

In the evaporated fuel processing technology described in Japanese Unexamined Patent Application Publication No. 2004-11561, leak diagnosis of the evaporated fuel sealing system is performed through a step of performing leak diagnosing of a canister section of the evaporated fuel sealing system and, subsequently, a step of performing a whole evaporated fuel sealing system leak diagnosis. In addition, the canister section leak diagnosis and the whole evaporated fuel sealing system leak diagnosis are performed under condition that the seal valve properly functions. Therefore, according to the evaporated fuel processing technology described in Japanese Unexamined Patent Application Publication No. 2004-11561, a function diagnosis as to whether the seal valve properly functions needs to be properly performed. However, Japanese Unexamined Patent Application Publication No. 2004-11561 neither describes nor suggests any function diagnosis of the seal valve.

Accordingly, the present disclosure describes a properly performed function diagnosis of the seal valve.

According to a first aspect of the present disclosure, an evaporated fuel processing device includes a seal valve disposed in a communication passage between a fuel tank mounted in a vehicle including an internal-combustion engine and the atmosphere, where the seal valve seals off the fuel tank from the atmosphere, a canister disposed in the communication passage between the seal valve and the atmosphere, where the canister collects evaporated fuel vented from the fuel tank via the communication passage, a changeover valve disposed in the communication passage between the canister and the atmosphere, where the changeover valve allows or inhibits the canister from communicating with the atmosphere, a canister internal pressure detecting unit disposed in a canister side section of the communication passage, where the canister side section is one of two sections of the communication passage divided at a position of the seal valve and including the canister, and configured to detect a canister internal pressure of the canister, a tank internal pressure detecting unit configured to detect a tank internal pressure of the fuel tank, a controller configured to send a command to open or close the seal valve and a command to switch the changeover valve between an atmosphere communication position and an atmosphere shut-off position, a diagnosis unit configured to perform a leak diagnosis of an evaporated fuel sealing system including the fuel tank, the canister, and the seal valve, and a pressure generating unit configured to generate pressure in the evaporated fuel sealing system via the changeover valve.

The diagnosis unit performs a leak diagnosis of the entirety of the evaporated fuel sealing system using the pressure generating unit and the canister internal pressure detecting unit with the seal valve open and with the changeover valve at the atmosphere shut-off position in response to the command from the control unit, and when the control unit closes the seal valve and, thereafter, sets the changeover valve at the atmosphere shut-off position, the diagnosis unit performs a function diagnosis of the seal valve with the seal valve closed and with the changeover valve at the atmosphere shut-off position by determining whether a detection value of the tank internal pressure detected by the tank internal pressure detecting unit varies beyond a predetermined range of the pressure generated by the pressure generating unit. Accordingly, the function diagnosis of the seal valve can be properly performed.

According to a second aspect of the present disclosure, an evaporated fuel processing device is based on the evaporated fuel processing device according to the first aspect. The function diagnosis of the seal valve can be started after a predetermined wait time elapses from the time the controller closes the seal valve. Since the function diagnosis of the seal valve is performed when the seal valve is closed and the state of the fuel tank is stable after the predetermined wait time has elapsed, the function diagnosis of the seal valve can be properly performed.

According to a third aspect of the present disclosure, an evaporated fuel processing device is based on the evaporated fuel processing device according to the second aspect. The controller can stop the pressure generating unit for a predetermined wait time from the time the seal valve is closed until the function diagnosis of the seal valve is started. Accordingly, the evaporated fuel processing device can provide reduction in power consumption in addition to the operation and effect of the second aspect.

According to a fourth aspect of the present disclosure, a method for diagnosing an evaporated fuel processing device is provided. The evaporated fuel processing device includes a seal valve disposed in a communication passage between a fuel tank of a vehicle including an internal-combustion engine and the atmosphere, where a seal valve seals off the fuel tank from the atmosphere, a canister disposed in the communication passage between the seal valve and the atmosphere, where the canister collects evaporated fuel vented from the fuel tank via the communication passage, a changeover valve disposed in the communication passage between the canister and the atmosphere, where the changeover valve allows or inhibits the canister from communicating with the atmosphere, a canister internal pressure detecting unit disposed in a canister side section of the communication passage, where the canister side section is one of two sections of the communication passage divided at a position of the seal valve and includes the canister, and configured to detect a canister internal pressure of the canister, a tank internal pressure detecting unit configured to detect the tank internal pressure of the fuel tank, a controller configured to send a command to open or close the seal valve and a command to switch the changeover valve between an atmosphere communication position and an atmosphere shut-off position, a diagnosis unit configured to perform a leak diagnosis of an evaporated fuel sealing system including the fuel tank, the canister, and the seal valve, and a pressure generating unit configured to generate pressure in the evaporated fuel sealing system via the changeover valve.

According to the fourth aspect of the present disclosure, the method for diagnosing the evaporated fuel processing device includes the step of performing a leak diagnosis of the entirety of the evaporated fuel sealing system using the diagnosis unit that uses the pressure generating unit and the canister internal pressure detecting unit when the seal valve is open and the changeover valve is set at the atmosphere shut-off position in response to the command from the control unit and the step of, after the leak diagnosis is performed, performing a leak diagnosis of the canister side section of the evaporated fuel sealing system using the diagnosis unit that uses the pressure generating unit and the canister internal pressure detecting unit when the seal valve is closed and the changeover valve is set at the atmosphere shut-off position in response to the command from the control unit.

In the step of performing a leak diagnosis of the canister side section of the evaporated fuel sealing system, the control unit switches the changeover valve to an atmosphere shut-off position after closing the seal valve. The diagnosis unit performs a function diagnosis of the seal valve with the seal valve closed and with the changeover valve at the atmosphere shut-off position by determining whether the detection value of the tank internal pressure detected by the tank internal pressure detecting unit varies beyond a predetermined range of the pressure generated by the pressure generating unit. In this manner, the function diagnosis of the seal valve can be properly performed. In addition, since the leak diagnosis of the entirety of the evaporated fuel sealing system is performed before the leak diagnosis of the canister side section of the evaporated fuel sealing system is performed, the result of the leak diagnosis of the entirety of the evaporated fuel sealing system can be obtained in a short time and with low power consumption.

According to a fifth aspect of the present disclosure, the method for diagnosing the evaporated fuel processing device is based on the method according to the fourth aspect. The function diagnosis of the seal valve can be performed when the seal valve is closed and the state of the fuel tank is stable after the predetermined wait time has elapsed. Accordingly, the function diagnosis of the seal valve can be properly performed.

According to a sixth aspect of the present disclosure, the method for diagnosing the evaporated fuel processing device is based on the method according to the fifth aspect. In the step of performing the leak diagnosis of the canister side section, the controller can stop the pressure generating unit for a predetermined wait time from the time the seal valve is closed until the function diagnosis of the seal valve is started. Accordingly, reduction in power consumption can be obtained in addition to the operation and effect of the fifth aspect.

According to the present disclosure, the function diagnosis of the seal valve can be properly performed.

BRIEF DESCRIPTION OF THE DRAWINGS

The advantages of the disclosure will become apparent in the following description taken in conjunction with the following drawings.

FIG. 2 is a functional block diagram of the evaporated fuel processing device according to the exemplary embodiment of the present disclosure.

FIG. 3A is a flowchart illustrating a diagnosis process performed by the evaporated fuel processing device according to the exemplary embodiment of the present disclosure.

DETAILED DESCRIPTION

An evaporated fuel processing device and a method for diagnosing an evaporated fuel processing device according to an exemplary embodiment of the present disclosure are described in detail below with reference to the accompanying drawings.

Outline of Evaporated Fuel Processing Device According to Exemplary Embodiment of Disclosure An evaporated fuel processing device 11 according to an exemplary embodiment of the present disclosure is described first with reference to the accompanying drawings. The evaporated fuel processing device 11 is applied to a hybrid vehicle including an internal-combustion engine and an electric motor (neither is illustrated) as a drive source. Note that the same reference symbols are used in the following drawings for the same members or similar members. In addition, for convenience of description, in some cases, the size and shape of the members may be schematically drawn by altering or enlarging them.

Figure 1A:
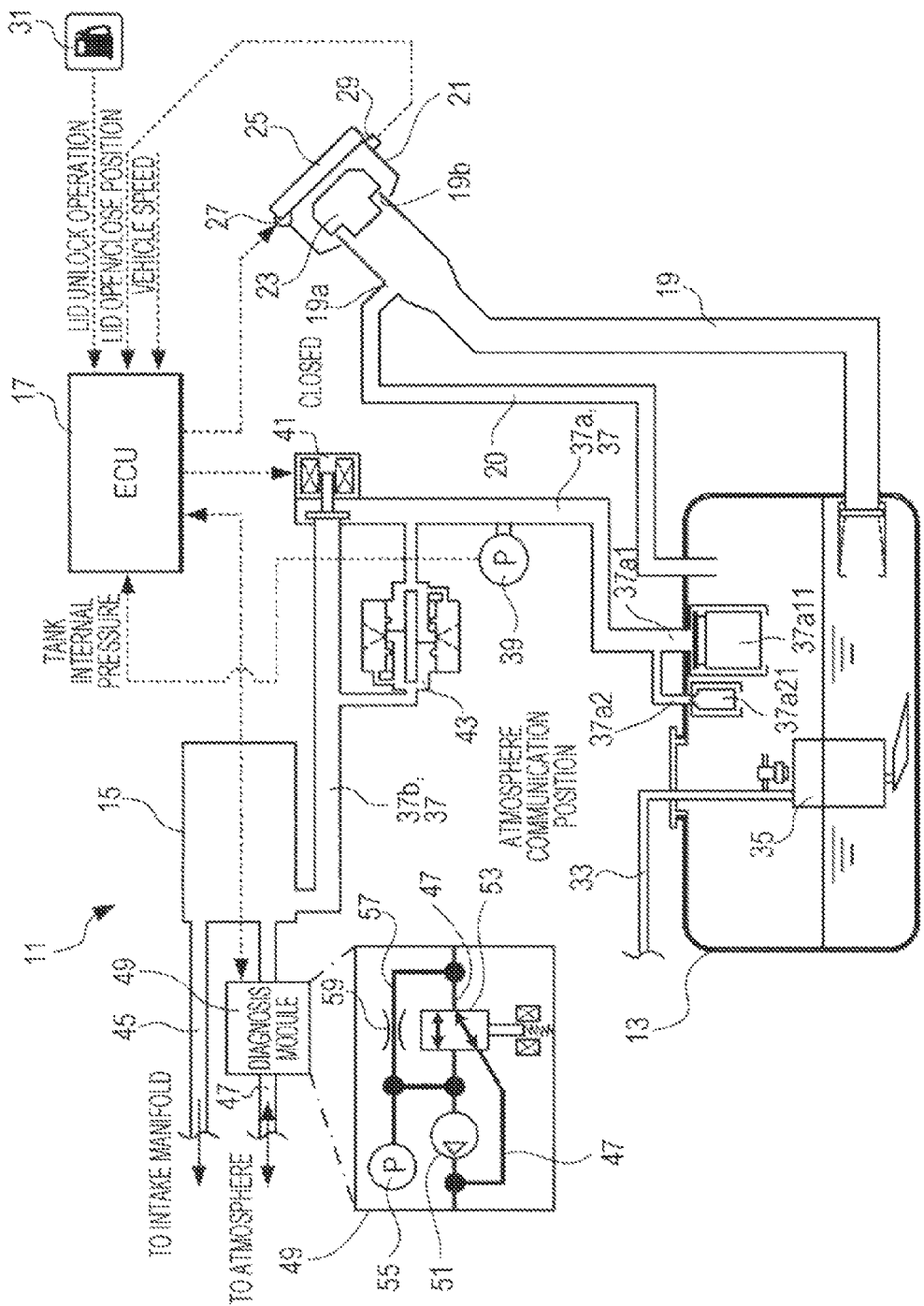
FIG. 1A is a schematic illustration of an evaporated fuel processing device according to an exemplary embodiment of the present disclosure at normal times.
Figure 1B:
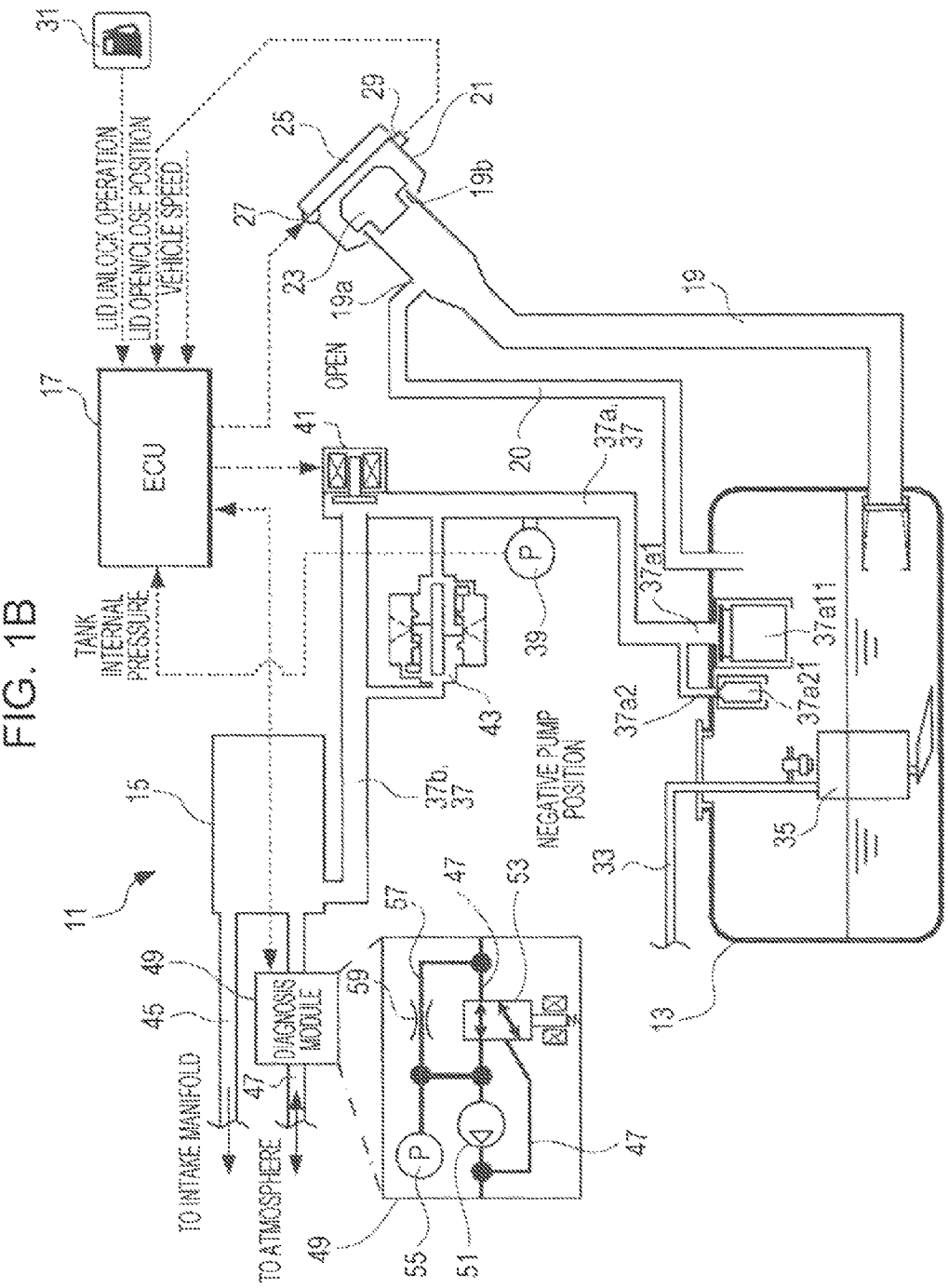
FIG. 1B is a schematic illustration of the evaporated fuel processing device according to the exemplary embodiment of the present disclosure when the entirety of an evaporated fuel sealing system of the evaporated fuel processing device is diagnosed.
Figure 1C:
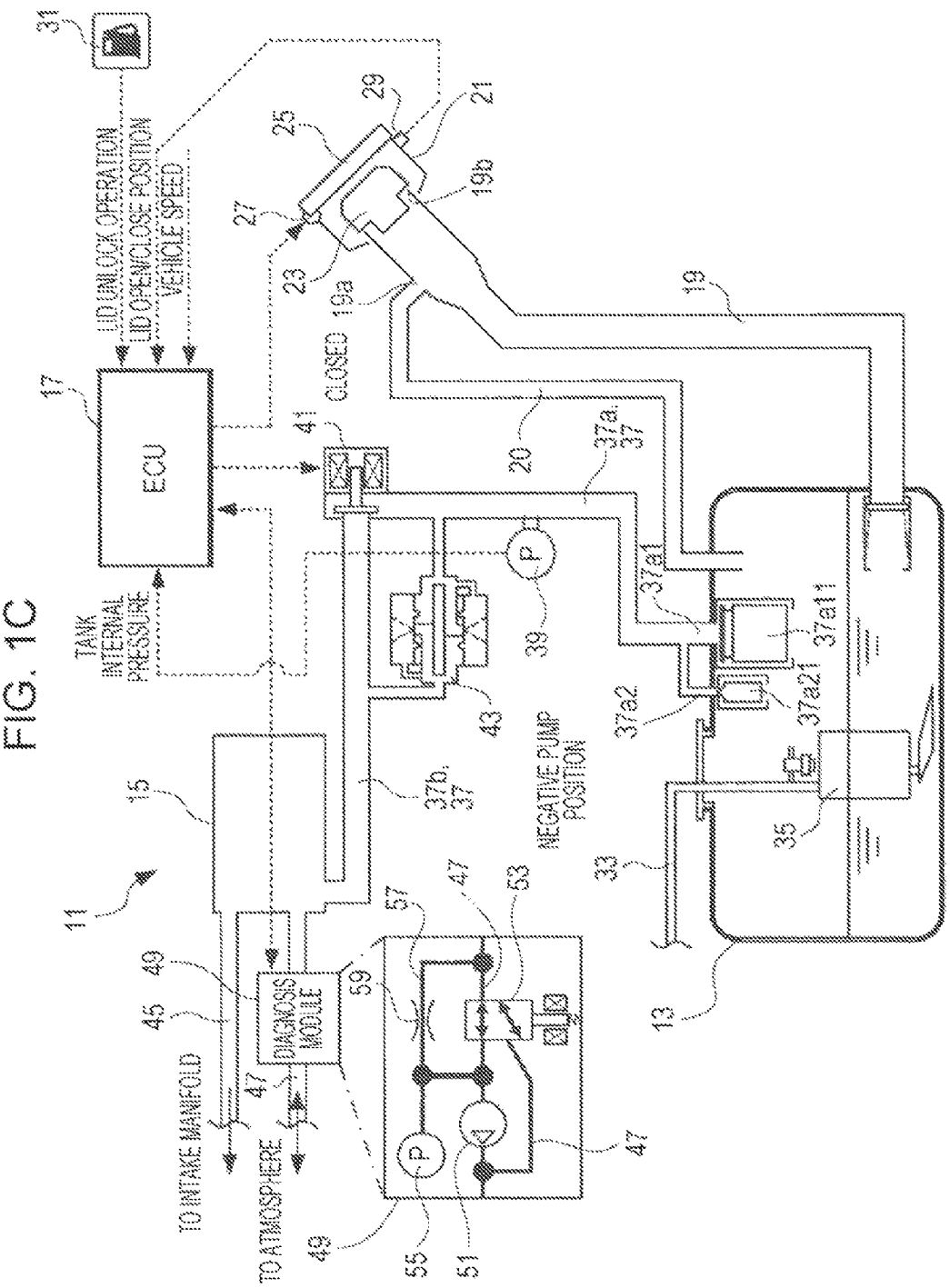
FIG. 1C is a schematic illustration of the evaporated fuel processing device when a canister side section of the evaporated fuel sealing system of the evaporated fuel processing device is diagnosed.

FIGS. 1A to 1C are schematic illustrations of the evaporated fuel processing device 11 according to the present exemplary embodiment of the disclosure. That is, FIG. 1A illustrates the evaporated fuel processing device 11 at normal times. FIG. 1B illustrates the evaporated fuel processing device 11 when the entirety of the evaporated fuel sealing system of the evaporated fuel processing device 11 is diagnosed. FIG. 1C illustrates the evaporated fuel processing device 11 when a section of the evaporated fuel sealing system including a canister is diagnosed. FIG. 2 is a functional block diagram of the evaporated fuel processing device 11.

As illustrated in FIGS. 1A to 1C, the evaporated fuel processing device 11 that processes the evaporated fuel includes a canister 15 having a function of absorbing evaporated fuel generated in a fuel tank 13 and an electronic control unit (ECU) 17 that performs overall control of the evaporated fuel processing device 11. Note that the same components in FIGS. 1A to 1C are described with reference to FIG. 1A. Only components that differ from those of FIG. 1A are described with reference to FIG. 1B or 1C as needed.

The fuel tank 13 that stores fuel, such as gasoline, includes a fuel inlet pipe 19. The fuel inlet pipe 19 includes a circulation pipe 20 that allows an upstream portion 19a of the fuel inlet pipe 19 to communicate with the fuel tank 13. In addition, the fuel inlet pipe 19 has a fuel filler opening 19b at an end remote from the fuel tank 13. The fuel filler opening 19b allows a nozzle of a fueling gun (neither is illustrated) to be inserted thereinto. The fuel filler opening 19b is contained in a fuel inlet box 21 that is formed in a rear fender (not illustrated) of a vehicle body (not illustrated) so as to have a concave shape. The fuel filler opening 19b allows a screw filler cap 23 to be attached thereto.

The fuel inlet box 21 has a fuel lid 25 that covers the screw filler cap 23 in an openable or closable manner. The fuel lid 25 includes a lid lock mechanism 27 for inhibiting the fuel lid 25 to open. A lid switch 31 is provided in the interior of the vehicle. The lid switch 31 is operated by an operator in order to remotely unlock the lid lock mechanism 27 when refueling.

The fuel lid 25 includes a lid sensor 29 that detects whether the fuel lid 25 is open or closed. Open/close information regarding the fuel lid 25 that is detected by the lid sensor 29 is sent to the ECU 17.

At normal times other than a refueling time, the fuel lid 25 is closed and is locked by the lid lock mechanism 27. In contrast, during refueling, when the lid switch 31 is operated and if predetermined conditions described below are satisfied, the ECU 17 instructs the lid lock mechanism 27 to unlock the fuel lid 25. In this manner, the fuel lid 25 is unlocked. The operator removes, from the fuel filler opening 19b, the screw filler cap 23 that is accessible after the fuel lid 25 is open and inserts a nozzle of a fueling gun (neither is illustrated) into the fuel filler opening 19b. Thereafter, the operator can pour fuel into the fuel tank 13.

The fuel tank 13 includes a fuel pump module 35 that pumps and delivers fuel contained in the fuel tank 13 to an injector (not illustrated) via a fuel supply passage 33. In addition, the fuel tank 13 includes an evaporated fuel discharging passage 37 (corresponding to a "communication passage communicating a fuel tank with the atmosphere" of the disclosure). The evaporated fuel discharging passage 37 allows the fuel tank 13 to communicate with the canister 15. The evaporated fuel discharging passage 37 can function as a flow passage of the evaporated fuel.

The evaporated fuel discharging passage 37 branches into two portions at the end adjacent to the fuel tank 13. One of the two portions of the evaporated fuel discharging passage 37 is a passage 37a1, and the other is a passage 37a2. The passage 37a1 includes a float valve 37a11, and the passage 37a2 includes a cut valve 37a21.

The float valve 37a11 operates so as to close if the liquid level of fuel rises and, thus, a tank internal pressure Ptank, which is the pressure of the gas phase region in the fuel tank 13, increases. More specifically, if the fuel tank 13 is fully filled with fuel, the float valve 37a11 is closed to prevent the fuel from entering the evaporated fuel discharging passage 37 from the fuel tank 13.

In contrast, the cut valve 37a21 operates to close if the vehicle leans at a predetermined angle or more. More specifically, the cut valve 37a21 is open on a full tank of fuel. However, if the vehicle leans at a predetermined angle or more, the cut valve 37a21 is closed. In this manner, the fuel is prevented from entering the evaporated fuel discharging passage 37 from the fuel tank 13.

The evaporated fuel discharging passage 37 includes a tank internal pressure sensor 39, a seal valve 41, and a high-pressure two-way valve 43. Note that in the following description, the evaporated fuel discharging passage 37 has two sections divided at the position of the seal valve 41. One of the sections adjacent to the fuel tank 13 is also referred to as a "first evaporated fuel discharging passage 37a". The other section of the evaporated fuel discharging passage 37 adjacent to the canister 15 is also referred to as a "second evaporated fuel discharging passage 37b". In addition, the first evaporated fuel discharging passage 37a and the second evaporated fuel discharging passage 37b are collectively referred to as the "evaporated fuel discharging passage 37".

The tank internal pressure sensor 39 (corresponding to a "tank internal pressure detecting unit" of the present disclosure) provided in the first evaporated fuel discharging passage 37a has a function of detecting the tank internal pressure Ptank, which is the pressure in the gas phase region of the fuel tank 13. However, a configuration in which the tank internal pressure sensor 39 is directly attached to the fuel tank 13 may be employed. A piezoelectric element can be used as a pressure detecting device of the tank internal pressure sensor 39.

Information regarding the tank internal pressure Ptank detected by the tank internal pressure sensor 39 is sent to the ECU 17.

The seal valve 41 has a function of sealing the internal space of the fuel tank 13 from the atmosphere. More specifically, the seal valve 41 is a normally-closed electromagnetic valve that operates in response to an open/close control signal sent from the ECU 17. As described in more detail below, the seal valve 41 operates so as to seal the internal space of the fuel tank 13 from the atmosphere or allow the internal space to communicate with the atmosphere in accordance with the open/close control signal.

The high-pressure two-way valve 43 has a function of controlling the flow direction of the evaporated fuel on the basis of a difference between the pressure in the section adjacent to the fuel tank 13 and the pressure on the section adjacent to the canister 15. More specifically, the high-pressure two-way valve 43 is disposed parallel to the seal valve 41 in the evaporated fuel discharging passage 37. The high-pressure two-way valve 43 is a mechanical valve formed by combining a diaphragm positive pressure valve and a diaphragm negative pressure valve.

The positive pressure valve of the high-pressure two-way valve 43 operates so as to open when the pressure in the section adjacent to the fuel tank 13 is higher than the pressure in the section adjacent to the canister 15 by a predetermined pressure level. Through such an open operation, the evaporated fuel having an increased high pressure in the fuel tank 13 is transferred toward the canister 15 via the positive pressure valve of the high-pressure two-way valve 43.

In contrast, the negative pressure valve of the high-pressure two-way valve 43 operates so as to open when the pressure on the section adjacent to the fuel tank 13 is lower than the pressure in the section adjacent to the canister 15 by a predetermined pressure level. Through such an open operation, the evaporated fuel stored in the canister 15 is returned toward the fuel tank 13 via the negative pressure valve of the high-pressure two-way valve 43.

The canister 15 connected to the second evaporated fuel discharging passage 37b includes the adsorbent (not illustrated) formed of active charcoal for absorbing the evaporated fuel. The adsorbent of the canister 15 absorbs the evaporated fuel delivered from the fuel tank 13 via the evaporated fuel discharging passage 37. In addition to the second evaporated fuel discharging passage 37b, the canister 15 is connected to a purge passage 45 and an atmospheric air introduction passage 47 so as to communicate with the purge passage 45 and the atmospheric air introduction passage 47. The canister 15 performs purge processing in which the air drawn via the atmospheric air introduction passage 47 is delivered to an intake manifold (not illustrated) through the purge passage 45 together with the evaporated fuel absorbed by the adsorbent of the canister 15.

An end of the purge passage 45 remote from the canister 15 is connected to the intake manifold so as to communicate with the intake manifold. In contrast, an end of the atmospheric air introduction passage 47 remote from the canister 15 communicates with the atmosphere. The atmospheric air introduction passage 47 has a diagnosis module 49 provided therein.

More specifically, as illustrated in FIGS. 1A to 1C, the diagnosis module 49 includes the atmospheric air introduction passage 47 and a bypass passage 57 disposed parallel to the atmospheric air introduction passage 47. The atmospheric air introduction passage 47 includes a changeover valve 53. The changeover valve 53 has a function of allowing or inhibiting the canister 15 from communicating with the atmosphere. More specifically, the changeover valve 53 is an electromagnetic valve that operates in accordance with a switching signal sent from the ECU 17. When the changeover valve 53 is not powered on and is in an OFF mode, the changeover valve 53 allows the canister 15 to communicate with the atmosphere (refer to FIG. 1A). In contrast, when a switching signal is sent from the ECU 17 and, thus, the changeover valve 53 enters an ON mode, the changeover valve 53 inhibits the canister 15 from communicating with the atmosphere (refer to FIGS. 1B and 1C).

The bypass passage 57 includes a negative pressure pump 51, a canister internal pressure sensor 55, and a reference orifice 59. The negative pressure pump 51, which corresponds to a "pressure generating unit" of the present disclosure, has a function of causing the internal pressure of the evaporated fuel sealing system to be a negative pressure below the atmospheric pressure by discharging gas in the internal space of an evaporated fuel sealing system to the atmosphere.

As used herein, the term "evaporated fuel sealing system" refers to a closed space containing the fuel tank 13, the evaporated fuel discharging passage 37, the seal valve 41, the canister 15, the atmospheric air introduction passage 47, and the diagnosis module 49. The evaporated fuel sealing system is formed from the following two closed sections: a fuel tank side section and a canister side section. The fuel tank side section extends from the fuel tank 13 to the seal valve 41 via the first evaporated fuel discharging passage 37a. The canister side section extends from the seal valve 41 to the canister 15 via the second evaporated fuel discharging passage 37b and further extends to the diagnosis module 49 via the atmospheric air introduction passage 47.

The canister internal pressure sensor 55, which corresponds to a "canister internal pressure detecting unit" of the present disclosure, has a function of detecting a canister internal pressure of the canister 15. Note that if the changeover valve 53 is switched to an "atmosphere communication position" (refer to FIG. 1A) at which the canister 15 can communicate with the atmosphere, the canister internal pressure sensor 55 detects the atmospheric pressure). In contrast, if the seal valve 41 is open (refer to FIG. 1B) and, thus, the fuel tank 13 communicates with the canister 15 via the evaporated fuel discharging passage 37 (i.e., the changeover valve 53 is switched to an "atmosphere shut-off position" at which the canister 15 is closed off from the atmosphere), the canister internal pressure sensor 55 detects a variation of the tank internal pressure of the fuel tank 13.

As described in more detail below, the reference orifice 59 is used when setting a leak determination threshold value used for determining whether leakage has occurred when leak diagnosis of the evaporated fuel sealing system is performed.

As described in more detail below, the diagnosis module 49 is used for performing a leak diagnosis of the evaporated fuel sealing system and a function diagnosis of the seal valve 41 and the changeover valve 53.

As illustrated in FIG. 2, an ignition switch 30, the lid switch 31, the lid sensor 29, the tank internal pressure sensor 39, the canister internal pressure sensor 55, and a vehicle speed sensor 61 which form an input system are connected to the ECU 17. Note that the ECU 17 functions as a "control unit" of the present disclosure. The vehicle speed sensor 61 has a function of detecting the speed of a vehicle (not illustrated) (the vehicle speed). Vehicle speed information detected by the vehicle speed sensor 61 is sent to the ECU 17.

In addition, as illustrated in FIG. 2, the seal valve 41, the changeover valve 53, the negative pressure pump 51, the lid lock mechanism 27, and a notification unit 57 which form an output system are connected to the ECU 17. The notification unit 57 notifies information regarding the leak diagnosis of the evaporated fuel sealing system and the function diagnosis of the seal valve 41 and the changeover valve 53. More specifically, a display unit, such as a liquid crystal display, or a sound output unit, such as a speaker, disposed in the interior of the vehicle can be suitably used as the notification unit 57.

As illustrated in FIG. 2, the ECU 17 includes an internal pressure information acquiring unit 65, a diagnosis unit 67, and a controller 69.

The ECU 17 is formed from a microcomputer including a central processing unit (CPU), a read only memory (ROM), and a random access memory (RAM). The microcomputer reads a program and data stored in the ROM and performs a variety of types of control, such as internal pressure information acquiring function control and diagnosis function control as performed in the ECU 17. In addition, the microcomputer performs overall control of the evaporated fuel processing device 11.

The internal pressure information acquiring unit 65 has a function of acquiring the tank internal pressure detected by the tank internal pressure sensor 39 or the canister internal pressure sensor 55 or the internal pressure information regarding the canister internal pressure.

The diagnosis unit 67 has a function of performing a leak diagnosis of the evaporated fuel sealing system and a failure diagnosis of the seal valve 41 and the changeover valve 53 (e.g., diagnosis of the valve being stuck open or closed). In addition, when the canister internal pressure sensor 55 performs detection and if the tank internal pressure varies beyond a predetermined range, the diagnosis unit 67 operates so as to determine that evaporated fuel does not leak from the fuel tank 13 of the evaporated fuel sealing system. Note that a period of time for the canister internal pressure sensor 55 to perform detection is set so as to be a minimum period of time during which the canister internal pressure sensor 55 can detect the variation of the tank internal pressure. This is because the amount of the evaporated fuel delivered to the canister 15 can be minimized.

The diagnosis unit 67 further has a function of diagnosing the internal pressure detection function of the canister internal pressure sensor 55. More specifically, the diagnosis unit 67 diagnoses the internal pressure detection function of the canister internal pressure sensor 55 by referring to a detection value of the tank internal pressure detected by the tank internal pressure sensor 39.

Thereafter, when the seal valve 41 is open and the changeover valve 53 is at an atmosphere shut-off position in response to a command from the controller 69, the diagnosis unit 67 performs leak diagnosis on the entirety of the evaporated fuel sealing system using the negative pressure pump 51 and the canister internal pressure sensor 55. If the result of the diagnosis indicates the occurrence of failure, the diagnosis unit 67 performs leak diagnosis of the canister side section of the evaporated fuel sealing system (the space on the side of the canister 15) using the negative pressure pump 51 and the canister internal pressure sensor 55 when the seal valve 41 is closed and the changeover valve 53 is at an atmosphere shut-off position in response to a command from the controller 69.

The controller 69 includes an SOAK timer 71 (refer to FIG. 2). The SOAK timer 71 measures an elapsed time from the time the ignition switch 30 is turned off. The controller 69 monitors whether an elapsed time SOAK indicated by a count value of the SOAK timer 71 from the time the ignition switch 30 is turned off exceeds a predetermined time SOAKth. Note that the tank internal pressure Ptank varies after the ignition switch 30 is turned off due to evaporation of the fuel caused by the residual heat and condensation of fuel vapor (devolatilization of fuel vapor) caused by an ambient temperature. Thus, the predetermined time SOAKth is set so as to be a period of time required from turn-off of the ignition switch 30 until the difference between the atmospheric pressure and the tank internal pressure Ptank reaches a sufficiently large value, as needed. For example, the predetermined time SOAKth is set to "5 hours".

If it is determined that the elapsed time SOAK exceeds the predetermined time SOAKth, the controller 69 sequentially performs the following predetermined diagnosis processes.

In addition, for example, during times when the internal-combustion engine is not running, the controller 69 sends an open command for opening the seal valve 41 and sends a shut-off command for causing the changeover valve 53 to switch to an atmosphere shut-off position.

Operation Performed by Evaporated Fuel Processing Device According to Exemplary Embodiment (Method for Diagnosing Evaporated Fuel Processing Device)

Figure 3B:
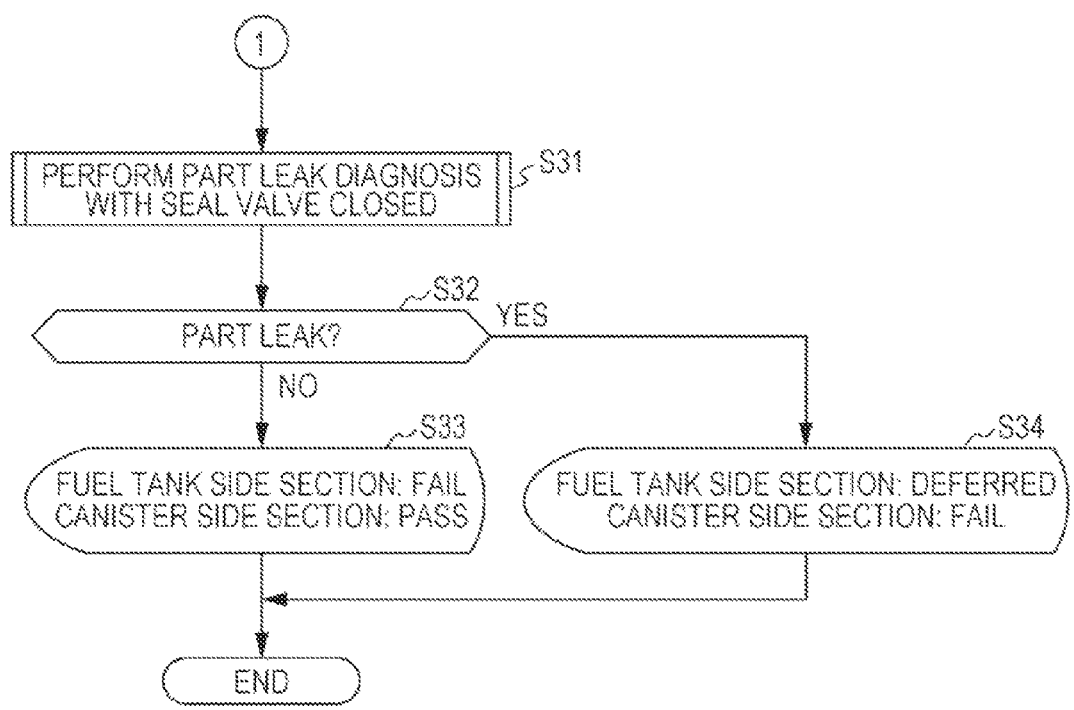
FIG. 3B is a flowchart illustrating a diagnosis process performed by the evaporated fuel processing device according to the exemplary embodiment of the present disclosure.
Figure 3C:
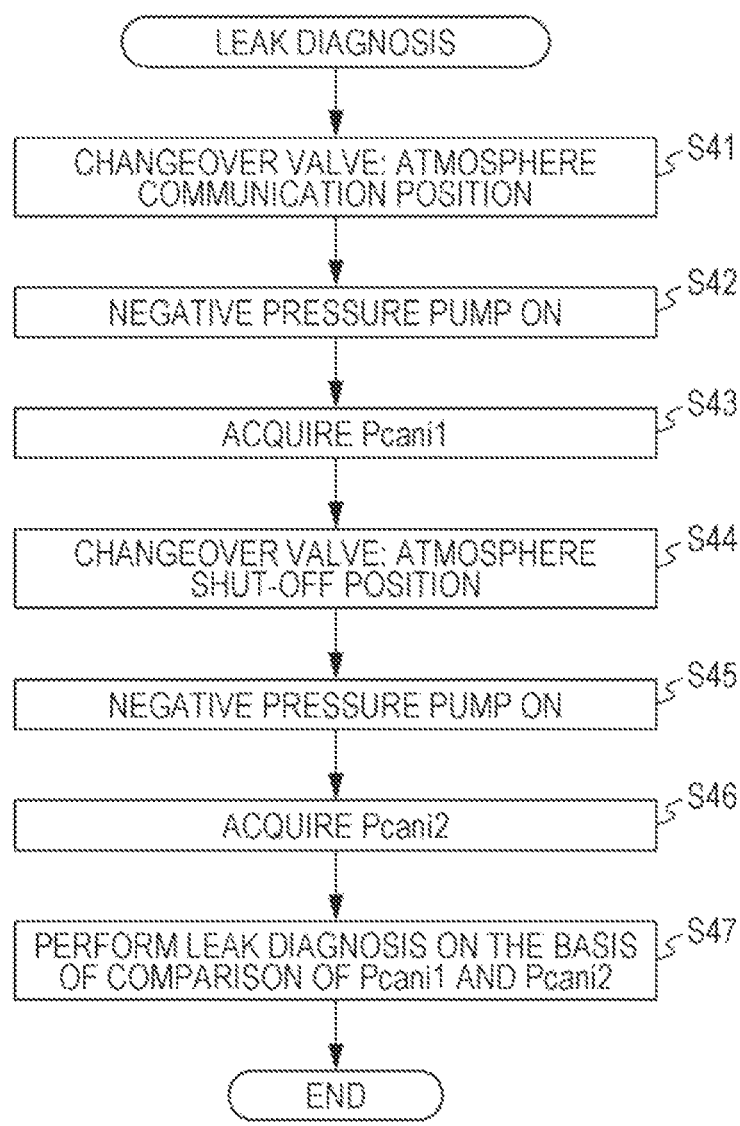
FIG. 3C is a flowchart of a leak diagnosis process performed by the evaporated fuel processing device according to the exemplary embodiment of the present disclosure.

The operation performed by the evaporated fuel processing device 11 according to the exemplary embodiment (a method for diagnosing the evaporated fuel processing device 11) is described below with reference to FIGS. 3A to 3C. FIGS. 3A and 3B are flowcharts illustrating the diagnosis processes performed by the evaporated fuel processing device 11 according to the present exemplary embodiment of the present disclosure. FIG. 3C is a flowchart of a leak diagnosis process performed by the evaporated fuel processing device 11 according to the present exemplary embodiment of the present disclosure.

Note that in an example illustrated in FIGS. 3A and 3B, the ignition switch 30 is turned off and the ECU 17 is in a sleep mode. At that time, a diagnosis process is performed. As used herein, the term "sleep mode" refers to an operation mode of the ECU 17 in which the operation of the ECU 17 is limited to determination as to whether the elapsed time SOAK, which is the count value of the SOAK timer 71, exceeds the predetermined time SOAKth in order to reduce the power consumption.

In addition, in the example, as illustrated in FIG. 1A, the seal valve 41 of the evaporated fuel processing device 11 is in a closed mode, and the changeover valve 53 of the evaporated fuel processing device 11 is at an atmosphere communication position that allows the canister 15 to communicate with the atmosphere.

As illustrated in FIG. 3, in step S11, the ECU 17 determines whether the elapsed time SOAK, which is the count value of the SOAK timer 71, exceeds the predetermined time SOAKth. The ECU 17 repeats the determination process in step S11 until the elapsed time SOAK exceeds the predetermined time SOAKth. If the result of determination made in step S11 is "time-out" indicating that the elapsed time SOAK exceeds the predetermined time SOAKth ("Yes" in step S11), the processing performed by the ECU 17 proceeds to step S12.

In step S12, when triggered by the time-out determination made in step S11 and indicating that the elapsed time SOAK exceeds the predetermined time SOAKth, the ECU 17 wakes up and enters, from the sleep mode, a normal mode in which the ECU 17 can perform a variety of functions.

In step S13, the internal pressure information acquiring unit 65 acquires the tank internal pressure Ptank detected by the tank internal pressure sensor 39 when "time-out" determination is made in step S11.

In step S14, the controller 69 determines whether the tank internal pressure Ptank acquired in step S13 converges to a value near atmospheric pressure (a predetermined allowable range of the atmospheric pressure). If, in step S14, it is determined that the tank internal pressure Ptank converges to the value near atmospheric pressure ("Yes" in step S14), the processing of the ECU 17 proceeds to step S15. However, if, in step S14, it is determined that the tank internal pressure Ptank is outside the allowable range of the atmospheric pressure ("No" in step S14), the processing of the ECU 17 proceeds to step S23, which is described below.

In general, if the elapsed time SOAK after a vehicle is parked exceeds the predetermined time SOAKth, the tank internal pressure Ptank is outside the allowable range of the atmospheric pressure. Inside the fuel tank 13 of the parked vehicle, the fuel evaporates or evaporated fuel condenses due to the residual heat of the internal-combustion engine and the ambient temperature. In addition, according to the present exemplary embodiment, the fuel tank 13 of the evaporated fuel processing device 11 has a sealed structure in which the seal valve 41 is closed during times when the internal-combustion engine is not running.

If the evaporated fuel leaks from the fuel tank 13 (i.e., if the fuel tank 13 communicates with the atmosphere), the tank internal pressure Ptank tends to converge to the value near atmospheric pressure. Accordingly, tentative diagnosis as to whether the evaporated fuel leaks can be made by determining whether the tank internal pressure Ptank converges to near atmospheric pressure.

The reason why "tentative diagnosis" is made is that in some cases, the tank internal pressure Ptank converges to near atmospheric pressure even when the evaporated fuel does not leak from the fuel tank 13. Leak diagnosis of the fuel tank 13 to be made in such cases is described in detail below.

If, in step S14, it is determined that the tank internal pressure Ptank converges to near atmospheric pressure, the controller 69 sends a command to open the seal valve 41 in step S15. In addition, as illustrated in FIG. 1B, the diagnosis unit 67 performs entirety leak diagnosis for the entirety of the evaporated fuel sealing system with the seal valve 41 open. As used herein, the term "entirety leak" refers to a leak somewhere in the evaporated fuel sealing system.

Although description of the diagnosis process continues, the flow of the leak diagnosis process is described next with reference to FIG. 3C. Note that the leak diagnosis process is categorized into two types: a entirety leak diagnosis process and a part leak diagnosis process. The entirety leak diagnosis process differs from the part leak diagnosis process in terms of the open/close state of the seal valve 41. That is, in a entirety leak diagnosis process, the seal valve 41 is open. In contrast, in a part leak diagnosis process (a leak diagnosis process of the canister-side space of the evaporated fuel sealing system), the seal valve 41 is closed.

The entirety leak diagnosis process corresponds to "leak diagnosis of the entirety of the evaporated fuel sealing system" of the present disclosure. In addition, the part leak diagnosis process corresponds to "leak diagnosis of the canister side section of the evaporated fuel sealing system" of the present disclosure.

As illustrated in FIG. 3C, in step S41, the controller 69 sends a command to switch the changeover valve 53 to the atmosphere communication position so that the canister 15 communicates with the atmosphere. Upon receiving the command, the changeover valve 53 is switched to the atmosphere communication position. Note that if the changeover valve 53 has already been switched to the atmosphere communication position, the need for the processing in step S41 can be eliminated.

In step S42, the controller 69 sends a command to turn on the negative pressure pump 51. Upon receiving the command, the negative pressure pump 51 operates so that the internal pressure of the evaporated fuel sealing system is negative below the atmospheric pressure by venting gas in the internal space of the evaporated fuel sealing system to the atmosphere. Note that since the gas is vented through the canister 15, the evaporated fuel is not directly vented to the atmosphere.

In step S43, the internal pressure information acquiring unit 65 acquires a first canister internal pressure Pcani1 detected by the canister internal pressure sensor 55. Note that as illustrated in FIG. 1A, the canister internal pressure sensor 55 is connected to the atmospheric air introduction passage 47 via the reference orifice 59. In addition, in step S41, the changeover valve 53 is switched to the atmosphere communication position. Accordingly, the first canister internal pressure Pcani1 acquired by the internal pressure information acquiring unit 65 using the canister internal pressure sensor 55 converges to a negative pressure value that is the same as a pressure value obtained when the negative pressure pump 51 operates with a hole equivalent to the reference orifice 59 open in the evaporated fuel sealing system.

The negative pressure value of the converged first canister internal pressure Pcani1 is stored in a nonvolatile memory 68 of the diagnosis unit 67 as the leak determination threshold value. The leak determination threshold value is used as a reference value when it is determined whether a hole having a size larger than that of the reference orifice 59 is formed in the evaporated fuel sealing system. Note that the hole diameter of the reference orifice 59 is appropriately determined in accordance with the size of a leak hole to be detected.

In step S44, the controller 69 sends a command to switch the changeover valve 53 to an atmosphere shut-off position at which the canister 15 is shut off from the atmosphere. Upon receiving the command, the changeover valve 53 is switched the atmosphere shut-off position.

In step S45, the controller 69 sends a command to turn on the negative pressure pump 51. Upon receiving the command, the negative pressure pump 51 expels gas in the internal space of the evaporated fuel sealing system to the atmosphere so that the internal pressure of the evaporated fuel sealing system becomes a negative pressure below the atmospheric pressure.

In step S46, the internal pressure information acquiring unit 65 acquires a second canister internal pressure Pcani2 detected by the canister internal pressure sensor 55.

In step S47, the diagnosis unit 67 performs a leak diagnosis of the evaporated fuel sealing system to be diagnosed on the basis of the result of comparison of the first canister internal pressure Pcani1 acquired in step S43 and the second canister internal pressure Pcani2 acquired in step S46.

At that time, in step S44, the changeover valve 53 is switched to the atmosphere shut-off position. Accordingly, if there is no leak (including the case in which a hole of a diameter smaller than the hole diameter of the reference orifice 59 is formed), the second canister internal pressure Pcani2 acquired by the internal pressure information acquiring unit 65 using the canister internal pressure sensor 55 tends to relatively quickly reach a negative pressure value (below the atmospheric pressure) that is higher than the leak determination threshold value.

However, if a hole of a diameter larger than the hole diameter of the reference orifice 59 is formed (i.e., if there is a leak), the second canister internal pressure Pcani2 tends to gradually reach a negative pressure value (below the atmospheric pressure or a non-negative value) that is lower than the leak determination threshold value.

That is, if, on the basis of the result of comparison of the first canister internal pressure Pcani1 and the second canister internal pressure Pcani2, the second canister internal pressure Pcani2 tends to relatively quickly reach a negative pressure value (below the atmospheric pressure) that is higher than the leak determination threshold value, the diagnosis unit 67 determines that leakage is not occurring.

However, if the second canister internal pressure Pcani2 tends to gradually reach a negative pressure value (below the atmospheric pressure or a non-negative value) that is lower than the leak determination threshold value, the diagnosis unit 67 determines that leakage is occurring due to formation of a hole having a diameter that is larger than the hole diameter of the reference orifice 59.

Note that in actual leak diagnosis process, if the processing from steps S41 to S43 is performed in advance to obtain the leak determination threshold value, the need for the processing from steps S41 to S43 can be eliminated. In such a case, in step S47, the diagnosis unit 67 makes a leak diagnosis of the evaporated fuel sealing system to be diagnosed in the above-described manner on the basis of the result of comparison of the leak determination threshold value and the second canister internal pressure Pcani2.

Referring back to the diagnosis process illustrated in FIG. 3A, in step S16, the diagnosis unit 67 determines whether entirety leak occurs on the basis of the result of diagnosis made in step S15. If, in step S16, it is determined that entirety leak does not occur ("No" in step S16), the processing of the ECU 17 proceeds to step S17. However, if, in step S16, it is determined that entirety leak occurs ("Yes" in step S16), the processing of the ECU 17 proceeds to step S31.

In step S17, upon receiving the result of the entirety leak diagnosis made in step S16, the notification unit 57 sends information indicating that no evaporated fuel leaks out of either the fuel tank side section or the canister side section of the evaporated fuel sealing system.

In step S18, the controller 69 sends a close command to close the seal valve 41. In addition, as illustrated in FIG. 1C, the diagnosis unit 67 performs an evaporated fuel part leak diagnosis of the evaporated fuel sealing system with the seal valve 41 closed. As used herein, the term "evaporated fuel part leak diagnosis of the evaporated fuel sealing system" refers to a leak diagnosis of the canister side section of the evaporated fuel sealing system. In addition, the term "part leak" refers to a leak in the canister side section.

In step S19, the internal pressure information acquiring unit 65 acquires time-series data of the tank internal pressure Ptank detected by the tank internal pressure sensor 39 during the part leak diagnosis made in step S18.

In step S20, the controller 69 determines whether the time-series data of the tank internal pressure Ptank acquired in step S19 converge within a predetermined range. If, in step S20, it is determined that the time-series data of the tank internal pressure Ptank converge within the predetermined range ("Yes" in step S20), the processing of the ECU 17 proceeds to step S21. However, if, in step S20, it is determined that the time-series data of the tank internal pressure Ptank converge outside the predetermined range ("No" in step S20), the processing of the ECU 17 proceeds to step S22.

When part leak diagnosis is made in step S18 with the seal valve 41 properly maintained in the closed mode, the time-series data of the tank internal pressure Ptank detected by the tank internal pressure sensor 39 during the part leak diagnosis are supposed not to significant vary and, thus, converge within the predetermined range. This is because the tank internal pressure sensor 39 is disposed in the section of the evaporated fuel sealing system including the fuel tank 13 relative to the seal valve 41 and, thus, is isolated from the section of the evaporated fuel sealing system including the canister 15.

If, in step S20, it is determined that the time-series data of the tank internal pressure Ptank converge within the predetermined range, the notification unit 57 sends a message indicating that the seal valve 41 in the evaporated fuel sealing system functions normally (maintains the closed mode) in step S21. Thereafter, the ECU 17 ends the flow of the diagnosis process.

However, if in step S20, it is determined that the time-series data of the tank internal pressure Ptank converge outside the predetermined range, the notification unit 57 sends a message indicating that the seal valve 41 in the evaporated fuel sealing system functions abnormally (cannot maintain the closed mode) in step S22. Thereafter, the ECU 17 ends the flow of the diagnosis process.

If, in step S14, it is determined that the tank internal pressure Ptank is outside a near atmospheric pressure range, the controller 69 sends a command to continue to close the seal valve 41 in step S23. In addition, as illustrated in FIG. 1C, the diagnosis unit 67 performs an evaporated fuel part leak diagnosis of the evaporated fuel sealing system with the seal valve 41 closed.

In step S24, the diagnosis unit 67 determines whether part leak occurs on the basis of the result of the diagnosis made in step S23. If, in step S24, it is determined that part leak does not occur ("No" in step S24), the processing of the ECU 17 proceeds to step S25. However, if, in step S24, it is determined that part leak occurs ("Yes" in step S24), the processing of the ECU 17 proceeds to step S26.

In step S25, upon receiving the result of the part leak diagnosis made in step S23, the notification unit 57 sends a message indicating that no leakage occurs from any one of the fuel tank side space, the seal valve 41, and the canister side section of the evaporated fuel sealing system. Thereafter, the ECU 17 ends the flow of the diagnosis process.

In contrast, in step S26, upon receiving the result of the part leak diagnosis made in step S23, the notification unit 57 sends a message indicating that no leakage occurs from either the fuel tank side space or the seal valve 41, but leakage occurs from the canister side section of the evaporated fuel sealing system. Thereafter, the ECU 17 ends the flow of the diagnosis process.

If, in step S16, it is determined that entirety leak occurs, the controller 69 sends a close command to close the seal valve 41 in step S31 illustrated in FIG. 3B. In addition, as illustrated in FIG. 1C, the diagnosis unit 67 performs a part leak diagnosis of the evaporated fuel in the evaporated fuel sealing system with the seal valve 41 closed.

In step S32, the diagnosis unit 67 determines whether a part leak occurs on the basis of the result of the diagnosis made in step S31. If, in step S32, it is determined that no part leak occurs ("No" in step S32), the processing of the ECU 17 proceeds to step S33. However, if, in step S32, it is determined that a part leak occurs ("Yes" in step S32), the processing of the ECU 17 proceeds to step S34.

In step S33, upon receiving the result of the part leak diagnosis made in step S31, the notification unit 57 sends information indicating that the evaporated fuel leaks out of the fuel tank side section, but no evaporated fuel leaks out of the canister side section of the evaporated fuel sealing system. Thereafter, the ECU 17 ends the flow of the diagnosis process.

In contrast, in step S34, upon receiving the result of the part leak diagnosis made in step S31, the notification unit 57 sends information indicating that determination as to whether the evaporated fuel leaks out of the fuel tank side section cannot be made at that time and, thus, is deferred and the evaporated fuel leaks out of the canister side section. Thereafter, the ECU 17 stops the flow of the diagnosis process.

Figure 4A:
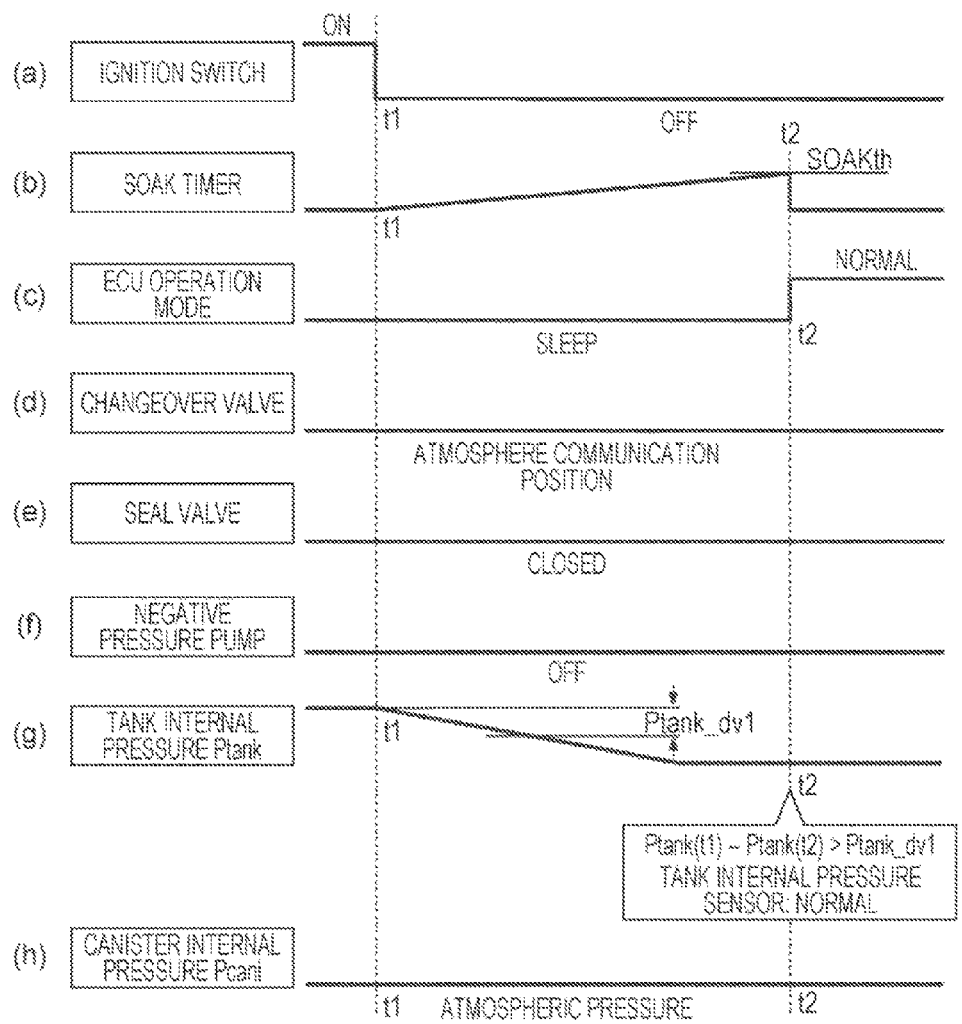
FIG. 4A is a timing diagram illustrating the operation performed by each of components of the evaporated fuel processing device from the time an ignition switch is turned off to the time a predetermined period of time elapses.
Figure 4B:
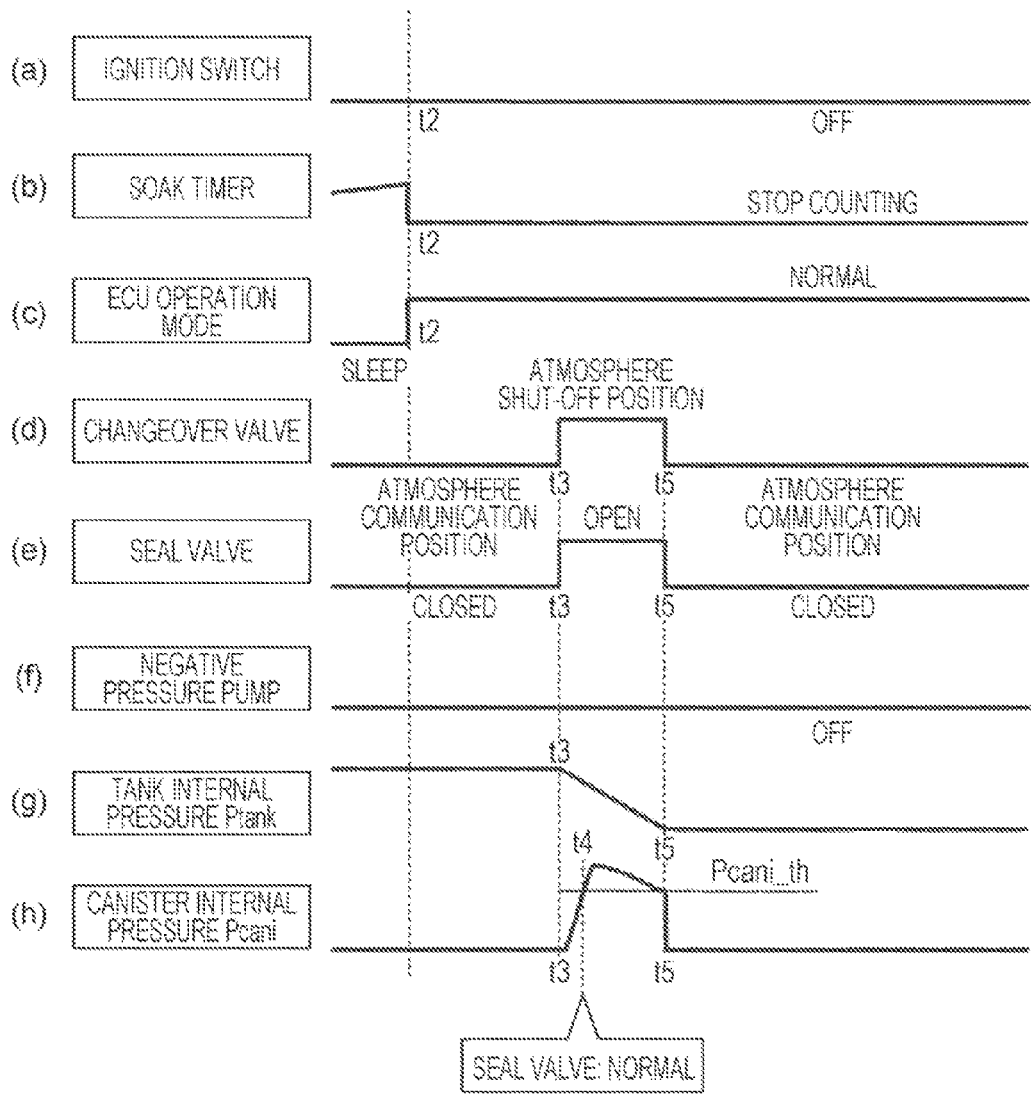
FIG. 4B is a timing diagram illustrating the operation performed by each component of the evaporated fuel processing device after the predetermined period of time elapses from the time the ignition switch is turned off.
Figure 4C:
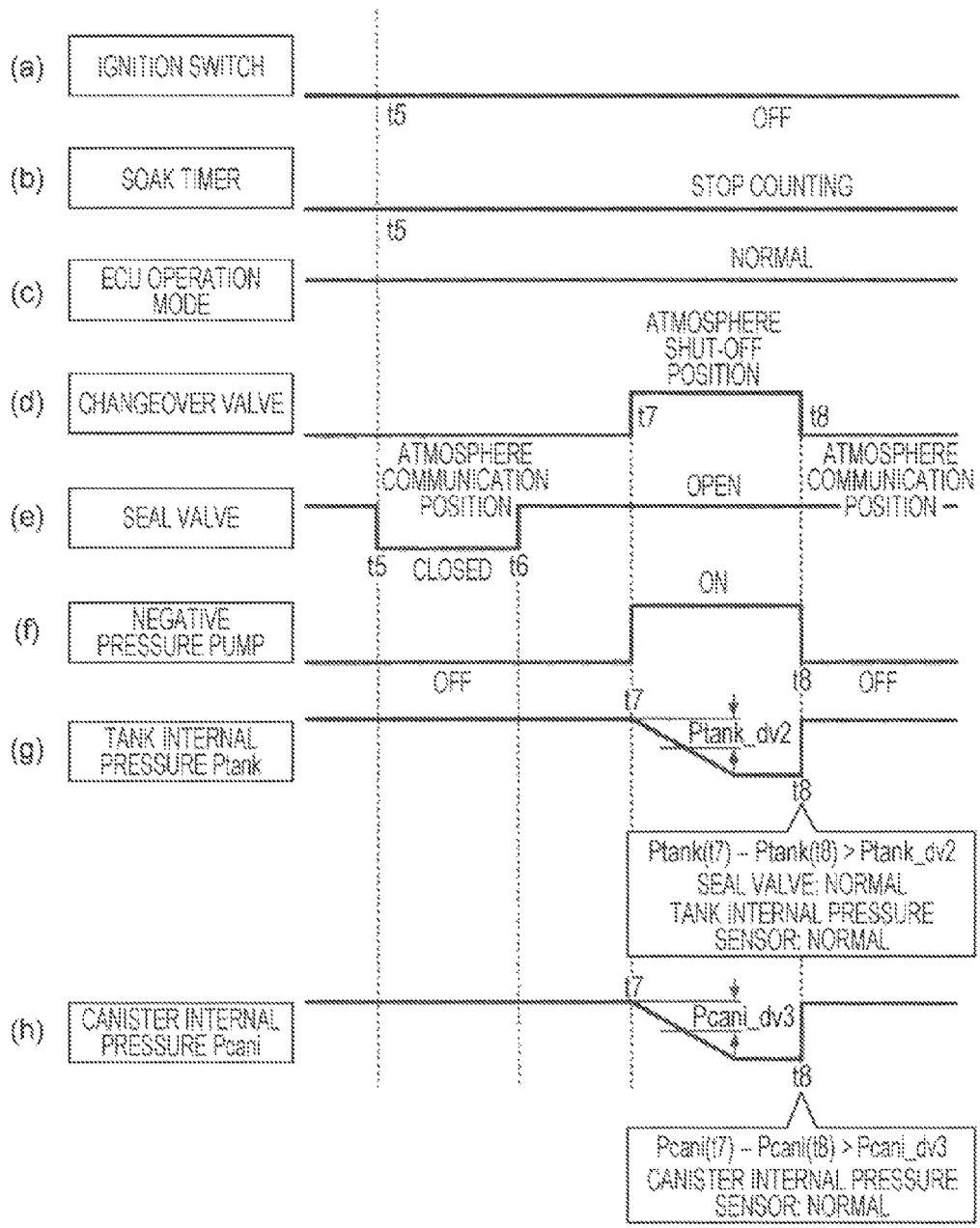
FIG. 4C is a timing diagram illustrating the operation performed by each component of the evaporated fuel processing device after the predetermined period of time elapses from the time the ignition switch is turned off.

Time-Series Operation Performed by Evaporated Fuel Processing Device According to Exemplary Embodiment of Disclosure The time-Series operation Performed by the evaporated fuel processing device 11 according to the exemplary Embodiment is described in detail next with reference to FIGS. 4A to 4C. FIG. 4A is a timing diagram illustrating the operation performed by each of components of the evaporated fuel processing device 11 from the time the ignition switch 30 is turned off to the time a predetermined period of time elapses. FIGS. 4B to 4C are timing diagrams illustrating the operation performed by each component of the evaporated fuel processing device 11 after the predetermined period of time elapses from the time the ignition switch 30 is turned off.

As illustrated in FIG. 4A, at a time t1, if the ignition switch 30 is turned off from on (refer to part (a) of FIG. 4A), the SOAK timer 71 (refer to FIG. 2) starts counting (refer to part (b) of FIG. 4A). In addition, the tank internal pressure Ptank detected by the tank internal pressure sensor 39 gradually decreases (refer to part (g) of FIG. 4A). Note that in this example, it is a winter season, and the ambient temperature is low (e.g., a temperature lower than about 5° C.)

The operations performed at the time t1 illustrated in FIG. 4A by the components of the evaporated fuel processing device 11 other than the above-described components are described below. That is, the operation mode of the ECU 17 is a sleep mode (refer to part (c) of FIG. 4A). The changeover valve 53 is switched to the atmosphere communication position (refer to part (d) of FIG. 4A). The seal valve 41 is closed (refer to part (e) of FIG. 4A). The negative pressure pump 51 is turned off (refer to part (f) of FIG. 4A). A canister internal pressure Pcani detected by the canister internal pressure sensor 55 is the atmospheric pressure (refer to part (h) of FIG. 4A).

As illustrated in FIG. 4A, at a time t2, if the elapsed time SOAK from the time t1 at which the ignition switch 30 is turned off from on (i.e., the count value of the SOAK timer 71) exceeds the predetermined time SOAKth (i.e., the count value of the SOAK timer 71) (if SOAK>SOAKth (refer to part (b) of FIG. 4A), the operation mode of the ECU 17 changes from the sleep mode to a normal mode (refer to part (c) of FIG. 4A).

In addition, at the time t2 illustrated in FIG. 4A, the diagnosis unit 67 determines whether the tank internal pressure sensor 39 functions normally on the basis of whether a difference between a tank internal pressure Ptank(t1) acquired by the tank internal pressure sensor 39 at the time t1 and a tank internal pressure Ptank(t2) acquired by the tank internal pressure sensor 39 at the time t2 (i.e., Ptank(t1)−Ptank(t2)) is greater than a predetermined first difference threshold value Ptank_dv1. Note that the first difference threshold value Ptank_dv1 is set while taking into account that the difference (Ptank(t1)−Ptank(t2)) is some value excluding a detection error.

In general, if the elapsed time SOAK from the time a vehicle is parked exceeds the predetermined time SOAKth, the tank internal pressure Ptank is outside a near atmospheric pressure range. That is, evaporated fuel is generated inside the fuel tank 13 of the parked vehicle due to residual heat of the evaporated fuel processing device 11 and the ambient temperature. Note that the fuel tank 13 of the evaporated fuel processing device 11 according to the exemplary embodiment has a sealed structure in which the seal valve 41 is closed during times when the internal-combustion engine is not running.

In contrast, if, for example, the tank internal pressure sensor 39 does not function normally due to a stuck-at fault, the tank internal pressure Ptank, which is the detection value of the tank internal pressure sensor 39, tends to be the same at the times t1 and t2. Accordingly, tentative diagnosis as to whether the tank internal pressure sensor 39 functions normally can be made on the basis of whether or not the tank internal pressure Ptank tends to be the same at the times t1 and t2 (i.e., whether or not the difference (Ptank(t1)−Ptank(t2)) is greater than the first difference threshold value Ptank_dv1).

The reason why "tentative diagnosis" is made is that in some cases, the tank internal pressure sensor 39 functions normally even when the tank internal pressure Ptank detected by the tank internal pressure sensor 39 tends to be the same at the times t1 and t2. For example, in some actual cases, the tank internal pressure Ptank is the same at the times t1 and t2.

The result of the diagnosis as to whether the tank internal pressure sensor 39 functions normally is stored in the non-volatile memory 68 of the diagnosis unit 67. Thereafter, the result is informed to an occupant via the notification unit 57 when, for example, the ignition switch 30 is turned on.

The operations performed by the components of the evaporated fuel processing device 11 other than the above-described components at the time t2 illustrated in FIG. 4A are described below. That is, the operation mode of the ECU 17 is a normal mode (refer to part (c) of FIG. 4A). The changeover valve 53 is switched to the atmosphere communication position (refer to part (d) of FIG. 4A). The seal valve 41 is closed (refer to part (e) of FIG. 4A). The negative pressure pump 51 is turned off (refer to part (f) of FIG. 4A). The canister internal pressure Pcani detected by the canister internal pressure sensor 55 is the atmospheric pressure (refer to part (h) of FIG. 4A).

As illustrated in FIG. 4B, from a time t3 to a time t5, the changeover valve 53 is switched from the atmosphere communication position to the atmosphere shut-off position (refer to the time t3 illustrated in part (d) of FIG. 4B). Thereafter, the changeover valve 53 is switched to the atmosphere communication position again (refer to the time t5 illustrated in part (d) of FIG. 4B). At the same time, the seal valve 41 is changed from the closed mode to the open mode (refer to the time t3 illustrated in part (e) of FIG. 4B). Subsequently, after the seal valve 41 is open for a predetermined open period (t5−t3), the seal valve 41 is changed to the closed mode (refer to the time t5 illustrated in part (e) of FIG. 4B). Opening of the seal valve 41 triggers a decrease in the tank internal pressure Ptank detected by the tank internal pressure sensor 39 (refer to part (g) of FIG. 4B). In contrast, the canister internal pressure Pcani detected by the canister internal pressure sensor 55 increases (refer to part (h) of FIG. 4B). This is because at a time immediately before the time t3 illustrated in FIG. 4B, when the tank internal pressure Ptank is higher than the canister internal pressure Pcani (the atmospheric pressure) and if the seal valve 41 is normally opened with the changeover valve 53 switched to the atmosphere shut-off position (i.e., with the internal space of the canister-15 side section being small), the difference between the two internal pressures is quickly eliminated.

Accordingly, upon being triggered by opening of the seal valve 41, tentative diagnosis as to whether the seal valve 41 is changed from the closed mode to the open mode in a normal way can be made on the basis of whether the canister internal pressure Pcani rises above the predetermined threshold value Pcani_th (Pcani>Pcani_th, refer to a time t4 illustrated in part (h) of FIG. 4B).

The reason why "tentative diagnosis" is made is that in some actual cases, the seal valve 41 is changed from the closed state to the open state in a normal way (e.g., at a time immediately before the time t3, the difference between the canister internal pressure Pcani (the atmospheric pressure) and the tank internal pressure Ptank is negligibly small even when the canister internal pressure Pcani does not rise above the predetermined threshold value Pcani_th).

The result of the diagnosis as to whether the seal valve 41 is opened in a normal way is stored in the nonvolatile memory 68 of the diagnosis unit 67. Thereafter, the result is informed to an occupant via the notification unit 57 when, for example, the ignition switch 30 is turned on.

The operations performed by the components of the evaporated fuel processing device 11 other than the above-described components from the time t3 to the time t5 illustrated in FIG. 4B are described below. That is, the ignition switch 30 is turned off (refer to part (a) of FIG. 4B). The SOAK timer 71 stops counting (refer to part (b) of FIG. 4B). The operation mode of the ECU 17 is a normal mode (refer to part (c) of FIG. 4B). The changeover valve 53 is switched to the atmosphere communication position (refer to part (d) of FIG. 4B). The negative pressure pump 51 is turned off (refer to part (f) of FIG. 4B).

As illustrated in FIG. 4C, at a time t6, the seal valve 41 is changed from the closed mode to the open mode (refer to part (e) of FIG. 4C). At the time t6, the components of the evaporated fuel processing device 11 other than the above-described components operate as follows. That is, the ignition switch 30 is turned off (refer to part (a) of FIG. 4C). The SOAK timer 71 stops counting (refer to part (b) of FIG. 4C). The operation mode of the ECU 17 is a normal mode (refer to part (c) of FIG. 4C). The changeover valve 53 is switched to the atmosphere communication position (refer to part (d) of FIG. 4C). The negative pressure pump 51 is turned off (refer to part (f) of FIG. 4C). The tank internal pressure Ptank detected by the tank internal pressure sensor 39 is a constant value (refer to part (g) of FIG. 4C). Similarly, the canister internal pressure Pcani detected by the canister internal pressure sensor 55 is a constant value (refer to part (h) of FIG. 4C).

During a period of time from a time t7 to a time t8 illustrated in FIG. 4C, the changeover valve 53 is switched from the atmosphere communication position to the atmosphere shut-off position (refer to the time t7 illustrated in part (d) of FIG. 4C) and, thereafter, is switched from the atmosphere shut-off position to the atmosphere communication position again (refer to the time t8 illustrated in part (d) of FIG. 4C). In synchronization with the operation of the changeover valve 53, the negative pressure pump 51 is turned on from off (refer to the time t7 illustrated in part (f) of FIG. 4C) and, thereafter, is turned off from on again (refer to the time t8 illustrated in part (f) of FIG. 4C).

In addition, during a period of time from the time t7 to the time t8 illustrated in FIG. 4C (a switching period of the changeover valve 53 from the atmosphere communication position to the atmosphere shut-off position and a switching period of the negative pressure pump 51 from off to on), the tank internal pressure Ptank detected by the tank internal pressure sensor 39 decreases (refer to part (g) of FIG. 4C). In addition, the canister internal pressure Pcani detected by the canister internal pressure sensor 55 decreases (refer to part (h) of FIG. 4C). This is because by turning on and operating the negative pressure pump 51 with the seal valve 41 open, gas in the internal space of the evaporated fuel sealing system is vented to the atmosphere and, thus, the internal pressure of the evaporated fuel sealing system becomes negative.

Accordingly, when the seal valve 41 is open and if the negative pressure pump 51 is turned on, the diagnosis unit 67 can make a diagnosis as to whether the seal valve 41 and the tank internal pressure sensor 39 function normally on the basis of whether a difference between a tank internal pressure Ptank(t7) acquired at the time t7 using the tank internal pressure sensor 39 and a tank internal pressure Ptank(t8) acquired at the time t8 using the tank internal pressure sensor 39 (Ptank(t7)−Ptank(t8)) is greater than a predetermined second difference threshold value Ptank_dv2. Note that the second difference threshold value Ptank_dv2 is predetermined so that the difference (Ptank(t7)−Ptank(t8)) is a some value excluding a detection error.

The result of the diagnosis as to whether the seal valve 41 and the tank internal pressure sensor 39 function normally is stored in the nonvolatile memory 68 of the diagnosis unit 67. Thereafter, the result is informed to an occupant via the notification unit 57 when, for example, the ignition switch 30 is turned on.

In addition, when the negative pressure pump 51 is turned on with the seal valve 41 open, the diagnosis unit 67 can make a diagnosis as to whether the canister internal pressure sensor 55 functions normally on the basis of whether a difference between a tank internal pressure Ptank(t7) acquired at the time t7 using the canister internal pressure sensor 55 and a tank internal pressure Ptank(t8) acquired at the time t8 using the canister internal pressure sensor 55 (Ptank(t7)−Ptank(t8)) is greater than a predetermined third difference threshold value Pcani_dv3. Note that the third difference threshold value Pcani_dv3 is predetermined so that the difference (Pcani(t7)−Pcani(t8)) is a some value excluding a detection error.

The result of the diagnosis as to whether the canister internal pressure sensor 55 functions normally is stored in the nonvolatile memory 68 of the diagnosis unit 67. Thereafter, the result is informed to an occupant via the notification unit 57 when, for example, the ignition switch 30 is turned on.

The operations performed by the components of the evaporated fuel processing device 11 other than the above-described components from the time t7 to the time t8 illustrated in FIG. 4C are described below. That is, the ignition switch 30 is turned off (refer to part (a) of FIG. 4C). The SOAK timer 71 stops counting (refer to part (b) of FIG. 4C). The operation mode of the ECU 17 is a normal mode (refer to part (c) of FIG. 4C).

Figure 5:
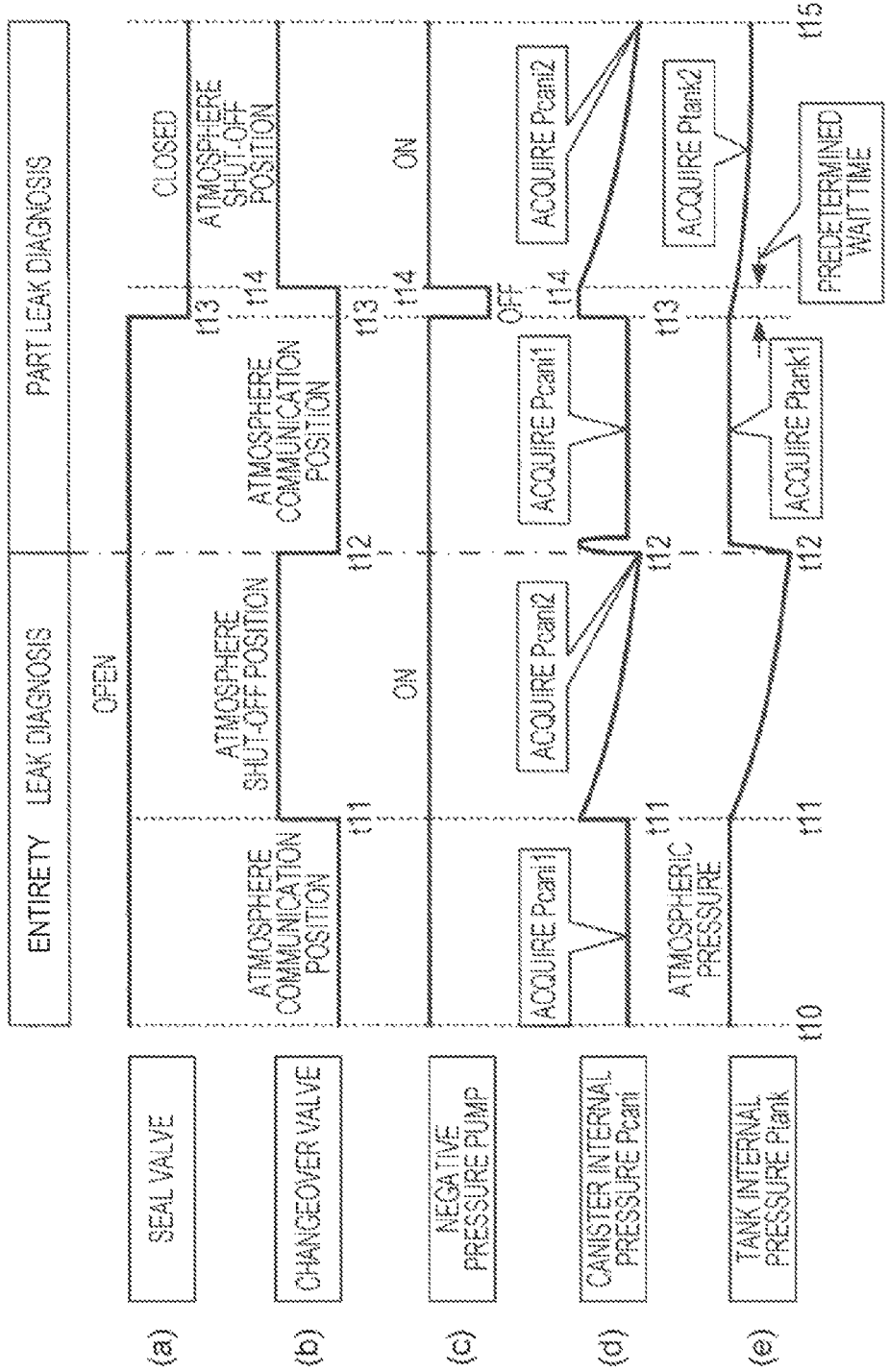
FIG. 5 is a timing diagram illustrating the operations performed by each component of the evaporated fuel processing device when an entirety leak diagnosis and a part leak diagnosis are continuously performed.

Detailed Time-Series Operations Performed in Entirety Leak Diagnosis and Part Leak Diagnosis A time-series operations performed by the evaporated fuel processing device 11 according to the present exemplary embodiment of the disclosure in the entirety leak diagnosis and the part leak diagnosis are described in detail below with reference to FIG. 5. FIG. 5 is a timing diagram illustrating the operations performed by the components of the evaporated fuel processing device 11 when the entirety leak diagnosis and the part leak diagnosis are continuously performed. Note that the time-series operations of the components of the evaporated fuel processing device 11 illustrated by the timing diagram of FIG. 5 correspond to the processes performed in steps S15 to S20 in the flowchart illustrated in FIG. 3A.

The time-series operations performed by the components of the evaporated fuel processing device 11 for the entirety leak diagnosis are described first. During a period of time from a time t10 to a time t11 illustrated in FIG. 5, in order to make the entirety leak diagnosis, the first canister internal pressure Pcani1 is acquired as the leak determination threshold value (refer to part (d) of FIG. 5).

The operations performed by the components of the evaporated fuel processing device 11 from the time t10 to the time t11 illustrated in FIG. 5 are described below. That is, the seal valve 41 is open (refer to part (a) of FIG. 5). The changeover valve 53 is switched to the atmosphere communication position (refer to part (b) of FIG. 5). The negative pressure pump 51 is turned on (refer to part (c) of FIG. 5).

The canister internal pressure Pcani detected by the canister internal pressure sensor 55 converges to a negative pressure value (the leak determination threshold value or the first canister internal pressure Pcani1) obtained when the negative pressure pump 51 operates through the reference orifice 59 (refer to part (d) of FIG. 5). This is because the changeover valve 53 is switched to the atmosphere communication position.

The tank internal pressure Ptank detected by the tank internal pressure sensor 39 converges to near atmospheric pressure (refer to part (e) of FIG. 5). This is because since the changeover valve 53 is switched to the atmosphere communication position and the seal valve 41 is made open, the tank internal pressure sensor 39 detects the atmospheric pressure.

If the changeover valve 53 is switched from the atmosphere communication position to the atmosphere shut-off position at a time t11 illustrated in FIG. 5, the canister internal pressure Pcani detected by the canister internal pressure sensor 55 instantaneously rises to near atmospheric pressure as triggered by the switching of the changeover valve 53. This is because the canister internal pressure sensor 55 detects the canister internal pressure Pcani at near atmospheric pressure through the changeover valve 53.

The operations performed by the functional components of the evaporated fuel processing device 11 other than the changeover valve 53 and the canister internal pressure Pcani at the time t11 illustrated in FIG. 5 are described below. That is, the seal valve 41 is open (refer to part (a) of FIG. 5). The negative pressure pump 51 is turned on (refer to part (c) of FIG. 5).

The tank internal pressure Ptank detected by the tank internal pressure sensor 39 converges to near atmospheric pressure (refer to part (e) of FIG. 5). This is because immediately after the changeover valve 53 is switched from the atmosphere communication position to the atmosphere shut-off position, the tank internal pressure Ptank maintains the immediately previous value (i.e., near atmospheric pressure).

During a period of time from the time t11 to a time t12 illustrated in FIG. 5, if the result of the entirety leak diagnosis is normal, the canister internal pressure Pcani detected by the canister internal pressure sensor 55 gradually decreases from near atmospheric pressure to below the leak determination threshold value (the first canister internal pressure Pcani1). This is because the canister internal pressure sensor 55 detects, through the changeover valve 53, the internal pressure of the evaporated fuel sealing system that is turned to a negative value by the negative pressure pump 51.

The canister internal pressure sensor 55 acquires a negative pressure value at about the time t12 illustrated in FIG. 5 as the second canister internal pressure Pcani2. If the second canister internal pressure Pcani2 tends to relatively quickly change to a negative pressure (below the atmospheric pressure) that is lower than the leak determination threshold value (the first canister internal pressure Pcani1), the diagnosis unit 67 determines that entirety leak does not occur on the basis of the result of comparison of the first canister internal pressure Pcani1 and the second canister internal pressure Pcani2.

In the same manner as described above, if the result of the entirety leak diagnosis is normal, the tank internal pressure Ptank detected by the tank internal pressure sensor 39 gradually decreases from the near atmospheric pressure to below the leak determination threshold value (the first canister internal pressure Pcani1). This is because the tank internal pressure sensor 39 detects the internal pressure of the evaporated fuel sealing system that is turned to a negative value by the negative pressure pump 51 through the seal valve 41 that is open.

The time-series operations of the components of the evaporated fuel processing device 11 performed in the entirety leak diagnosis have been described. Hereinafter, the time-series operations of the components of the evaporated fuel processing device 11 performed in a part leak diagnosis (a diagnosis of the canister side section) are described.

At a time close to the time t12 illustrated in FIG. 5, if the changeover valve 53 is switched from the atmosphere communication position to the atmosphere shut-off position, the canister internal pressure Pcani detected by the canister internal pressure sensor 55 instantaneously rises to near atmospheric pressure as triggered by the switching of the changeover valve 53. Thereafter, the canister internal pressure Pcani quickly converges to the leak determination threshold value (the first canister internal pressure Pcani1). This is because after the canister internal pressure sensor 55 instantaneously detects the canister internal pressure Pcani at near atmospheric pressure and, subsequently, the sensor 55 detects, through the reference orifice 59, the leak determination threshold value (the first canister internal pressure Pcani1) which is a negative pressure value obtained by operating the negative pressure pump 51.

The tank internal pressure Ptank detected by the tank internal pressure sensor 39 instantaneously rises to the near atmospheric pressure. Thereafter, the tank internal pressure Ptank maintains a pressure value of near atmospheric pressure (refer to part (e) of FIG. 5). This is because since the changeover valve 53 is switched to the atmosphere communication position and the seal valve 41 is made open, the tank internal pressure sensor 39 detects the atmospheric pressure.

The operations performed by the functional components of the evaporated fuel processing device 11 other than the changeover valve 53, the canister internal pressure Pcani, and the tank internal pressure Ptank at the time t12 illustrated in FIG. 5 are described below. That is, the seal valve 41 is made open (refer to part (a) of FIG. 5). The negative pressure pump 51 is turned on (refer to part (c) of FIG. 5).

During a period of time from the time t12 to a time t13 illustrated in FIG. 5, in order to make the part leak diagnosis (the diagnosis of the canister side section), the first canister internal pressure Pcani1 is acquired as the leak determination threshold value (refer to part (d) of FIG. 5).

The operations performed by the components of the evaporated fuel processing device 11 from the time t12 to the time t13 illustrated in FIG. 5 are described below. That is, the seal valve 41 is made open (refer to part (a) of FIG. 5). The changeover valve 53 is switched to the atmosphere communication position (refer to part (b) of FIG. 5). The negative pressure pump 51 is turned on (refer to part (c) of FIG. 5).

The canister internal pressure Pcani detected by the canister internal pressure sensor 55 converges to a negative pressure value (the leak determination threshold value or the first canister internal pressure Pcani1) obtained when the negative pressure pump 51 operates through the reference orifice 59 (refer to part (d) of FIG. 5). This is because the changeover valve 53 is switched to the atmosphere communication position.

The tank internal pressure Ptank detected by the tank internal pressure sensor 39 converges to near atmospheric pressure (refer to part (e) of FIG. 5). This is because since the changeover valve 53 is switched to the atmosphere communication position and the seal valve 41 is made open, the tank internal pressure sensor 39 detects the atmospheric pressure.

At the time t13 illustrated in FIG. 5, if the seal valve 41 is switched from the open mode to the closed mode and the negative pressure pump 51 is turned off from on, the canister internal pressure Pcani detected by the canister internal pressure sensor 55 quickly rises to the near atmospheric pressure as triggered by the switching. This is because since the negative pressure pump 51 stops, the canister internal pressure sensor 55 detects the canister internal pressure Pcani at near atmospheric pressure through the reference orifice 59.

The operations performed by the functional components of the evaporated fuel processing device 11 other than the seal valve 41, the negative pressure pump 51, and the canister internal pressure Pcani at the time t13 illustrated in FIG. 5 are described below. That is, the changeover valve 53 is switched to the atmosphere shut-off position (refer to part (b) of FIG. 5).

The tank internal pressure Ptank detected by the tank internal pressure sensor 39 converges to near atmospheric pressure (refer to part (e) of FIG. 5). This is because since the changeover valve 53 is switched to the atmosphere communication position and the seal valve 41 is made open, the tank internal pressure sensor 39 detects the atmospheric pressure.

Note that after the time t13 illustrated in FIG. 5, the tank internal pressure Ptank may gradually decrease, as illustrated in part (e) of FIG. 5. The reason is that when the tank internal pressure Ptank that decreased to the leak determination threshold value (the first canister internal pressure Pcani1) instantaneously rises to near atmospheric pressure, gas (e.g., cool air) having a temperature that differs from the ambient temperature inside the fuel tank 13 may flow into the fuel tank 13 at the time t12. In such a case, if the evaporated fuel in the fuel tank 13 is cooled and condensed after the seal valve 41 is closed (in the case where the fuel tank 13 is separated from the canister-15 side section of the evaporated fuel sealing system to be subjected to a part leak diagnosis), there is a risk of the tank internal pressure Ptank varying beyond a predetermined allowable range. As a result, the diagnosis unit 67 may miss the diagnosis and may determine that the seal valve 41 is stuck open.

To prevent such miss diagnosis, the evaporated fuel processing device 11 according to the present exemplary embodiment sets a predetermined wait time between the time t13 and a time t14. In this manner, even when the tank internal pressure Ptank gradually decreases after the time t13 because external air (cool air) flows into the fuel tank 13 at the time t12 to cool and condense the evaporated fuel in the fuel tank 13, the impact on the diagnosis can be minimized.

As illustrated in FIG. 5, at the time t14, when the changeover valve 53 is switched from the atmosphere communication position to the atmosphere shut-off position and, simultaneously, the negative pressure pump 51 is turned on from off, a function diagnosis of the seal valve 41 starts when triggered by the switching.

The operations performed by the components of the evaporated fuel processing device 11 other than the changeover valve 53 and the negative pressure pump 51 at the time t14 illustrated in FIG. 5 are described below. That is, the seal valve 41 is closed (refer to part (a) of FIG. 5). The negative pressure pump 51 is turned on (refer to part (c) of FIG. 5).

The canister internal pressure Pcani detected by the canister internal pressure sensor 55 converges to near atmospheric pressure (refer to part (d) of FIG. 5). This is because immediately after the negative pressure pump 51 is turned on from off, the canister internal pressure Pcani maintains the immediately previous value (near atmospheric pressure).

The tank internal pressure Ptank detected by the tank internal pressure sensor 39 has a value slightly lower than near atmospheric pressure (refer to part (e) of FIG. 5). This is because the external air (cool air) flows into the fuel tank 13 at the time t12 and, thus, the evaporated fuel in the fuel tank 13 is cooled and condensed. Note that such a slight variation does not cause the diagnosis unit 67 to miss the diagnosis, and the diagnosis unit 67 does not determine that the seal valve 41 is stuck open.

During a period of time from the time t14 to a time t15 illustrated in FIG. 5, if the result of the part diagnosis is normal, the canister internal pressure Pcani detected by the canister internal pressure sensor 55 gradually decreases from near atmospheric pressure to below the leak determination threshold value (the first canister internal pressure Pcani1). This is because the canister internal pressure sensor 55 detects, through the changeover valve 53, the internal pressure of the canister-15 side section of the evaporated fuel sealing system that is turned to a negative value by the negative pressure pump 51.

The canister internal pressure sensor 55 acquires a negative pressure value at about the time t15 illustrated in FIG. 5 as the second canister internal pressure Pcani2. If the second canister internal pressure Pcani2 tends to relatively quickly change to a negative pressure (below the atmospheric pressure) that is below the leak determination threshold value (the first canister internal pressure Pcani1), the diagnosis unit 67 determines that part leak does not occur on the basis of the result of comparison of the first canister internal pressure Pcani1 and the second canister internal pressure Pcani2.

However, if the result of the part leak diagnosis is normal, a variation of the tank internal pressure Ptank detected by the tank internal pressure sensor 39, which is a difference between a tank internal pressure Ptank1 and a tank internal pressure Ptank2 (refer to part (e) of FIG. 5), does not exceed a predetermined range.

The time-series operations of the components of the evaporated fuel processing device 11 performed during part leak diagnosis have been described.

Operation and Effect of Evaporated Fuel Processing Device According to Exemplary Embodiment of Disclosure In the following descriptions, the correspondence between specific elements and elements indicated by parentheses is provided for explanation purpose. Thus, such correspondence should not be interpreted as limiting the scope of the accompanying claims. The operation and effect of the evaporated fuel processing device 11 according to the present exemplary embodiment are described below. According to a first aspect of an embodiment of the present disclosure, the evaporated fuel processing device 11 includes the seal valve 41 disposed in the evaporated fuel discharging passage (a communication passage) 37 between the fuel tank 13 mounted in a vehicle including an internal-combustion engine and the atmosphere, where the seal valve 41 seals off the fuel tank 13 from the atmosphere, the canister 15 disposed in the evaporated fuel discharging passage (the communication passage) 37 between the seal valve 41 and the atmosphere, where the canister 15 collects evaporated fuel vented from the fuel tank 13 via the evaporated fuel discharging passage (the communication passage) 37, the changeover valve 53 disposed in the evaporated fuel discharging passage (the communication passage) 37 between the canister 15 and the atmosphere, where the changeover valve 53 allows or inhibits the canister 15 from communicating with the atmosphere, the canister internal pressure sensor (the canister internal pressure detecting unit) 55 disposed in a canister side section that is one of two sections of the evaporated fuel discharging passage (the communication passage) 37 divided at a position of the seal valve 41 and that includes the canister, where the canister internal pressure sensor 55 detects a canister internal pressure of the canister 15, the controller 69 configured to send a command to open or close the seal valve 41 and a command to switch the changeover valve 53 between an atmosphere communication position and an atmosphere shut-off position, the diagnosis unit 67 configured to perform a leak diagnosis of an evaporated fuel sealing system including the fuel tank 13, the canister 15, and the seal valve 41, and a negative pressure pump (a pressure generating unit) 51 configured to generate pressure in the evaporated fuel sealing system.

According to the first aspect, the evaporated fuel processing device 11 employs the following configuration. That is, the diagnosis unit 67 performs a leak diagnosis of the entirety of the evaporated fuel sealing system using the negative pressure pump (the pressure generating unit) 51 and the canister internal pressure sensor (the canister internal pressure detecting unit) 55 when the seal valve 41 is open and the changeover valve 53 is at an atmosphere shut-off position in response to a command from the controller 69. In addition, after closing the seal valve 41, the controller 69 sets the changeover valve 53 at an atmosphere shut-off position. Thereafter, the controller 69 performs a function diagnosis of the seal valve 41 with the seal valve 41 closed and with the changeover valve 53 at the atmosphere shut-off position by determining whether the value of the tank internal pressure Ptank detected by the tank internal pressure sensor (the tank internal pressure detecting unit) 39 varies beyond a predetermined range of the pressure generated by the negative pressure pump (a pressure generating unit) 51.

In the evaporated fuel processing device 11 according to the first aspect, the function diagnosis of the seal valve 41 is performed with the seal valve 41 closed and with the changeover valve 53 at an atmosphere shut-off position on the basis of whether the value of the tank internal pressure Ptank detected by the tank internal pressure sensor (the tank internal pressure detecting unit) 39 varies beyond a predetermined range of a pressure generated by the negative pressure pump (a pressure generating unit) 51. Accordingly, the function diagnosis of the seal valve 41 can be properly performed.

According to a second aspect of the embodiment of the present disclosure, an evaporated fuel processing device 11 is based on the evaporated fuel processing device 11 according to the first aspect. The evaporated fuel processing device 11 employs the following configuration. The function diagnosis of the seal valve 41 is started after a predetermined wait time elapses from the time the controller 69 closes the seal valve 41.

According to the evaporated fuel processing device 11 of the second aspect, the function diagnosis of the seal valve 41 is performed when the seal valve 41 is closed and the state of the fuel tank 13 is stable after the predetermined wait time has elapsed. Accordingly, the function diagnosis of the seal valve 41 can be more properly performed.

According to a third aspect of the embodiment of the present disclosure, an evaporated fuel processing device 11 is based on the evaporated fuel processing device 11 according to the second aspect. The evaporated fuel processing device 11 employs the following configuration. That is, the controller 69 stops the negative pressure pump (a pressure generating unit) 51 for a predetermined wait time from the time the seal valve 41 is closed until the function diagnosis of the seal valve 41 is started.

According to the evaporated fuel processing device 11 of the third aspect, the controller 69 stops the negative pressure pump (a pressure generating unit) 51 for a predetermined wait time from the time the seal valve 41 is closed until the function diagnosis of the seal valve 41 is started. Accordingly, the evaporated fuel processing device 11 can provide reduction in power consumption in addition to the operation and effect of the second aspect.

According to a fourth aspect of an embodiment of the present disclosure, a method for diagnosing an evaporated fuel processing device 11 is provided. The evaporated fuel processing device 11 includes the seal valve 41 disposed in the evaporated fuel discharging passage (a communication passage) 37 between the fuel tank 13 mounted in a vehicle including an internal-combustion engine and the atmosphere, where the seal valve 41 closes off the fuel tank 13 from the atmosphere, the canister 15 disposed in the evaporated fuel discharging passage (the communication passage) 37 between the seal valve 41 and the atmosphere, where the canister 15 collects evaporated fuel vented from the fuel tank 13 via the evaporated fuel discharging passage (the communication passage) 37, the changeover valve 53 disposed in the evaporated fuel discharging passage (the communication passage) 37 between the canister 15 and the atmosphere, where the changeover valve 53 allows or inhibits the canister 15 from communicating with the atmosphere, the canister internal pressure sensor (the canister internal pressure detecting unit) 55 disposed in a canister side section that is one of two sections of the evaporated fuel discharging passage (the communication passage) 37 divided at a position of the seal valve 41 and that includes the canister, where the canister internal pressure sensor 55 detects a canister internal pressure of the canister 15, the controller 69 configured to send a command to open or close the seal valve 41 and a command to switch the changeover valve 53 between an atmosphere communication position and an atmosphere shut-off position, the diagnosis unit 67 configured to perform a leak diagnosis of an evaporated fuel sealing system including the fuel tank 13, the canister 15, and the seal valve 41, and the pressure generating unit 51 configured to generate pressure in the evaporated fuel sealing system.

According to the method for diagnosing the evaporated fuel processing device 11 of the fourth aspect, in the step of performing a leak diagnosis of the section including the canister 15, the controller 69 switches the changeover valve 53 to an atmosphere shut-off position after closing the seal valve 41. The diagnosis unit 67 performs a function diagnosis of the seal valve 41 with the seal valve 41 closed and with the changeover valve 53 at the atmosphere shut-off position by determining whether the value of the tank internal pressure Ptank detected by the tank internal pressure sensor (the tank internal pressure detecting unit) 39 varies beyond a predetermined range of the pressure generated by the negative pressure pump (a pressure generating unit) 51.

According to the evaporated fuel processing device 11 of the fourth aspect, a function diagnosis of the seal valve 41 is performed with the seal valve 41 closed and with the changeover valve 53 at the atmosphere shut-off position by determining whether the detection value of the tank internal pressure Ptank detected by the tank internal pressure sensor (the tank internal pressure detecting unit) 39 varies beyond a predetermined range of a pressure generated by the negative pressure pump (a pressure generating unit) 51. Accordingly, the function diagnosis of the seal valve 41 can be properly performed.

In addition, in general, the probability of an abnormal result in leak diagnoses performed for the entirety of the evaporated fuel sealing system is low. Furthermore, there is strong demand for maintaining the result of leak diagnosis of the entirety of the evaporated fuel sealing system for a short time and with low power consumption.

Therefore, according to the fourth aspect, the method for diagnosing the evaporated fuel processing device 11 includes the step of performing a leak diagnosis of the entirety of the evaporated fuel sealing system with the seal valve 41 open and with the changeover valve 53 at the atmosphere shut-off position in response to the command from the controller 69 using the diagnosis unit 67 that uses the negative pressure pump (a pressure generating unit) 51 and the canister internal pressure sensor (the canister internal pressure detecting unit) 55 and, if the result of the leak diagnosis is abnormal, the step of performing a leak diagnosis of the canister-15 side section of the evaporated fuel sealing system with the seal valve 41 closed and with the changeover valve 53 at the atmosphere shut-off position in response to a command from the controller 69 using the diagnosis unit 67 that uses the negative pressure pump (a pressure generating unit) 51 and the canister internal pressure sensor (the canister internal pressure detecting unit) 55.

According to the method for diagnosing the evaporated fuel processing device 11 of the fourth aspect, a leak diagnosis of the entirety of the evaporated fuel sealing system is performed before a leak diagnosis of the canister-15 side section is performed. Accordingly, in addition to the effect of properly diagnosing the function of the seal valve 41, an effect of a leak diagnosis of the entirety of the evaporated fuel sealing system being performed in a short time and with low power consumption can be obtained.

According to the method for diagnosing the evaporated fuel processing device 11 of a fifth aspect, the function diagnosis of the seal valve 41 is performed when the seal valve 41 is closed and the state of the fuel tank 13 is stable due to the predetermined wait time. Accordingly, the function diagnosis of the seal valve 41 can be more properly performed.

According to a sixth aspect of the embodiment of the present disclosure, an evaporated fuel processing device 11 is based on the evaporated fuel processing device 11 according to the fifth aspect. The evaporated fuel processing device 11 employs the following configuration. That is, the controller 69 stops the negative pressure pump (a pressure generating unit) 51 from the time the seal valve 41 is closed to the time the function diagnosis of the seal valve 41 is started after a predetermined wait time elapses.

According to the method for diagnosing the evaporated fuel processing device 11 of the sixth aspect, the controller 69 stops the negative pressure pump (a pressure generating unit) 51 from the time the seal valve 41 is closed to the time the function diagnosis of the seal valve 41 is started after a predetermined wait time elapses. Accordingly, the evaporated fuel processing device 11 can provide reduction in power consumption in addition to the operation and effect of the fifth aspect.

Other Exemplary Embodiment

The above-described embodiments are provided as only examples for realizing the present disclosure, and it should not be construed that the technical scope of the present disclosure is limited thereto, since various embodiments will become apparent to those skilled in the art without departing from the scope and principles of this disclosure.

For example, while the exemplary embodiment of the present disclosure has been described with reference to a function diagnosis of the seal valve 41 performed as part of a leak diagnosis of the canister-15 side section if the result of leak diagnosis of the entirety of the evaporated fuel sealing system is normal, the present disclosure is not limited to such an example. An embodiment in which a function diagnosis of the seal valve 41 is performed independently from the step of performing a leak diagnosis of the canister-15 side section may be regarded as falling within the technical scope of the disclosure. In addition, an embodiment in which a function diagnosis of the seal valve 41 is performed regardless of whether the result of leak diagnosis of the entirety of the evaporated fuel sealing system is normal may be regarded as falling within the technical scope of the disclosure.

In addition, while the exemplary embodiment of the present disclosure has been described with reference to the example in which the negative pressure pump (a pressure generating unit) 51 is stopped from the time the seal valve 41 is closed to the time a function diagnosis of the seal valve 41 is started after a predetermined wait time elapses, the present disclosure is not limited to such an example. An embodiment in which the controller 69 continues to operate the negative pressure pump (a pressure generating unit) 51 from the time the controller 69 closes the seal valve 41 to the time a function diagnosis of the seal valve 41 is started after a predetermined wait time elapses may be regarded as falling within the technical scope of the disclosure.

Furthermore, while the exemplary embodiment of the present disclosure has been described with reference to the example in which when a leak diagnosis of the evaporated fuel sealing system is performed, the pressure of the internal space of the evaporated fuel sealing system is made negative using the negative pressure pump 51, the present disclosure is not limited to such an example. An embodiment in which when a leak diagnosis of the evaporated fuel sealing system is performed, the pressure of the internal space of the evaporated fuel sealing system is made positive using a positive pressure pump may be regarded as falling within the technical scope of the disclosure.

Still furthermore, while the exemplary embodiment of the present disclosure has been described under the condition that the ambient temperature of the parked vehicle is high, the present disclosure is applicable when the ambient temperature of the parked vehicle is low (e.g., a temperature of 0° C. or lower). When the ambient temperature of the parked vehicle is low, the internal pressure of a sealed fuel tank 13 becomes negative since the evaporated fuel in the fuel tank 13 is condensed into liquid fuel. In such a case, the present disclosure may be applied after appropriate modifications are made in the same manner as in the embodiment in which the internal pressure of a sealed fuel tank 13 is positive.

Yet still furthermore, while the exemplary embodiment of the present disclosure has been described with reference to the example in which the evaporated fuel processing device 11 of the embodiment is applied to a hybrid vehicle including an internal-combustion engine and an electric motor serving as a drive source, the present disclosure is not limited thereto. The present disclosure may be applied to a vehicle including only an internal-combustion engine serving as a drive source.

I claim:

1. An evaporated fuel processing device comprising:
    a seal valve disposed in a communication passage communicating a fuel tank with atmosphere, the fuel tank being mounted in a vehicle including an internal-combustion engine, the seal valve sealing off the fuel tank from the atmosphere;
    a canister disposed in the communication passage between the seal valve and the atmosphere, the canister collecting evaporated fuel vented from the fuel tank via the communication passage;
    a changeover valve disposed in the communication passage between the canister and the atmosphere, the changeover valve allowing or inhibiting the canister from communicating with the atmosphere;

a canister internal pressure detecting unit disposed in a canister side section of the communication passage, the canister side section being one of two sections of the communication passage divided at a position of the seal valve and including the canister, the canister internal pressure sensor detecting a canister internal pressure of the canister, a tank internal pressure detecting unit configured to detect a tank internal pressure of the fuel tank;

a controller configured to send a command to open or close the seal valve and a command to switch the changeover valve between an atmosphere communication position and an atmosphere shut-off position;

a diagnosis unit configured to perform a leak diagnosis of an evaporated fuel sealing system including the fuel tank, the canister, and the seal valve; and a pressure generating unit configured to generate pressure in the evaporated fuel sealing system via the changeover valve, wherein the diagnosis unit performs a leak diagnosis of the entirety of the evaporated fuel sealing system using the pressure generating unit and the canister internal pressure detecting unit with the seal valve in open state and with the changeover valve at the atmosphere shut-off position in response to the command from the control unit, and wherein when the control unit closes the seal valve and, thereafter, sets the changeover valve at the atmosphere shut-off position, the diagnosis unit performs a function diagnosis of the seal valve by determining whether a detection value of the tank internal pressure detected by the tank internal pressure detecting unit varies beyond a predetermined range while the pressure generating unit generates pressure on condition that the seal valve is closed and the changeover valve is at the atmosphere shut-off position.

2. The evaporated fuel processing device according to claim 1, wherein the function diagnosis of the seal valve is started after a predetermined wait time elapses from the time the control unit closes the seal valve.

3. The evaporated fuel processing device according to claim 2, wherein the control unit stops the pressure generating unit for the predetermined wait time from the time the seal valve is closed until the leak diagnosis of the seal valve starts.

4. The evaporated fuel processing device according to claim 1, wherein, by closing the seal valve, the seal valve separates the fuel tank from the canister side section of the communication passage, and wherein the pressure generating unit changes the pressure in the canister side section of the communication passage.

5. The evaporated fuel processing device according to claim 4, wherein the seal valve divides the communication passage into the canister side section and a tank side section connected to the fuel tank such that the canister side section communicates with the tank side section through the seal valve in open state.

6. The evaporated fuel processing device according to claim 1, wherein the pressure generating unit is connected to the canister side section via the changeover valve.

7. A method for diagnosing an evaporated fuel processing device, the evaporated fuel processing device including:

a seal valve disposed in a communication passage communicating a fuel tank with atmosphere, the fuel tank being mounted in a vehicle including an internal-combustion engine, and the seal valve configured to seal off the fuel tank from the atmosphere, a canister disposed in the communication passage between the seal valve and the atmosphere and configured to collect evaporated fuel vented from the fuel tank via the communication passage, a changeover valve disposed in the communication passage between the canister and the atmosphere and configured to allow or inhibit the canister from communicating with the atmosphere, a canister internal pressure detecting unit disposed in a canister side section of the communication passage, where the canister side section is one of two sections of the communication passage divided at a position of the seal valve and includes the canister, and configured to detect a canister internal pressure of the canister, a tank internal pressure detecting unit configured to detect a tank internal pressure of the fuel tank, a controller configured to send a command to open or close the seal valve and a command to switch the changeover valve between an atmosphere communication position and an atmosphere shut-off position, a diagnosis unit configured to perform a leak diagnosis of an evaporated fuel sealing system including the fuel tank, the canister, and the seal valve, and a pressure generating unit configured to generate pressure in the evaporated fuel sealing system via the changeover valve, the method comprising:

performing a leak diagnosis of the entirety of the evaporated fuel sealing system using the diagnosis unit that uses the pressure generating unit and the canister internal pressure detecting unit with the seal valve in open state and with the changeover valve at the atmosphere shut-off position in response to the command from the control unit; and performing, after performing the leak diagnosis of the entirety of the evaporated fuel sealing system, a leak diagnosis of the canister side section of the evaporated fuel sealing system using the diagnosis unit that uses the pressure generating unit and the canister internal pressure detecting unit with the seal valve closed and with the changeover valve at the atmosphere shut-off position in response to the command from the control unit, wherein in performing the leak diagnosis of the canister side section of the evaporated fuel sealing system, the control unit closes the seal valve and, thereafter, sets the changeover valve at the atmosphere shut-off position, and the diagnosis unit performs a function diagnosis of the seal valve by determining whether a detection value of the tank internal pressure detected by the tank internal pressure detecting unit varies beyond a predetermined range while the pressure generating unit generates pressure.

8. The method according to claim 7, wherein the function diagnosis of the seal valve is started after a predetermined wait time elapses from the time the control unit closes the seal valve.

9. The method according to claim 8, wherein the control unit stops the pressure generating unit for the predetermined wait time from the time the seal valve is closed to the time the leak diagnosis of the seal valve starts.

10. The method according to claim 7, wherein, by closing the seal valve, the seal valve separates the fuel tank from the canister side section of the communication passage, and wherein the pressure generating unit changes the pressure in the canister side section of the communication passage.

11. The method according to claim 10, wherein the seal valve divides the communication passage into the canister side section and a tank side section connected to the fuel tank such that the canister side section communicates with the tank side section through the seal valve in open state.

12. The method according to claim 7, wherein the pressure generating unit is connected to the canister side section via the changeover valve.

* * * * *